US007570392B2

United States Patent
Takahashi

(10) Patent No.: US 7,570,392 B2
(45) Date of Patent: *Aug. 4, 2009

(54) ERROR DIFFUSION METHOD AND APPARATUS USING WEIGHTED VECTORS ALONG A DIAGONAL TO CORRECT FOR NON-IDEAL INK EJECTION

(75) Inventor: Toru Takahashi, Matsumoto (JP)

(73) Assignee: Seiko Epson Corporation (JP)

( * ) Notice: Subject to any disclaimer, the term of this patent is extended or adjusted under 35 U.S.C. 154(b) by 535 days.

This patent is subject to a terminal disclaimer.

(21) Appl. No.: 11/340,185

(22) Filed: Jan. 26, 2006

(65) Prior Publication Data

US 2006/0170973 A1    Aug. 3, 2006

(30) Foreign Application Priority Data

Jan. 28, 2005 (JP) ............................ 2005-020834
Sep. 27, 2005 (JP) ............................ 2005-279404

(51) Int. Cl.
H04N 1/40 (2006.01)
G06K 9/00 (2006.01)
B41J 29/38 (2006.01)

(52) U.S. Cl. .................... 358/3.03; 358/3.04; 358/3.05; 382/252; 347/9; 347/12; 347/14; 347/15; 347/23

(58) Field of Classification Search ................. 358/1.9, 358/3.03, 3.05; 347/14–19, 9, 12, 23; 382/252
See application file for complete search history.

(56) References Cited

U.S. PATENT DOCUMENTS

| 6,283,571 | B1 | 9/2001 | Zhou et al. | |
|---|---|---|---|---|
| 6,293,643 | B1 * | 9/2001 | Shimada et al. | 347/15 |
| 6,328,404 | B1 | 12/2001 | Fujimori | |
| 6,908,176 | B2 | 6/2005 | Koitabashi | |
| 7,290,846 | B2 * | 11/2007 | Takahashi | 347/15 |
| 2003/0085939 | A1 | 5/2003 | Koitabashi | |
| 2003/0151773 | A1 * | 8/2003 | Ogawa et al. | 358/3.03 |
| 2004/0119766 | A1 | 6/2004 | Shibata | |
| 2004/0252148 | A1 * | 12/2004 | Shibata et al. | 347/14 |

(Continued)

FOREIGN PATENT DOCUMENTS

JP    01-235655    9/1989

(Continued)

*Primary Examiner*—Benny Q Tieu
*Assistant Examiner*—Christopher W Mutz
(74) *Attorney, Agent, or Firm*—Harness, Dickey & Pierce, P.L.C.

(57) ABSTRACT

A device including: an acquirer acquiring image data having an M-value (M≧3) pixel value; a memory storing nozzle information; another memory storing error diffusion matrices having different diffusion ratios of an error; a selector selecting specific pixel data in the image data; an N-value converter converting the M-value to an N value (M>N≧2); a diffuser diffusing the error to pixel data not subjected to the conversion in the image data according to the error diffusion matrix by using a difference between a selected pixel data value before and after conversion as the error; a generator generating print data defining nozzle dot information corresponding to the image data after the conversion; and a printer. The diffuser selects a specific error diffusion matrix for each selected pixel data according to the nozzle information, and diffuses the error to the pixel data not subjected to the conversion.

10 Claims, 17 Drawing Sheets

U.S. PATENT DOCUMENTS

| | | | |
|---|---|---|---|
| 2006/0170937 A1* | 8/2006 | Takahashi | 358/1.8 |
| 2006/0197793 A1* | 9/2006 | Takahashi et al. | 347/15 |

FOREIGN PATENT DOCUMENTS

| | | |
|---|---|---|
| JP | 05-030361 | 2/1993 |
| JP | 11-151821 | 8/1999 |
| JP | 11-254662 | 9/1999 |
| JP | 2000-79710 | 3/2000 |
| JP | 2000-190470 | 7/2000 |
| JP | 2000-225716 | 8/2000 |
| JP | 2002-019101 | 1/2002 |
| JP | 2003-063043 | 3/2003 |
| JP | 2003-136702 | 5/2003 |
| JP | 2004-058284 | 2/2004 |
| JP | 2004-284279 | 10/2004 |

* cited by examiner

FIG.11A

| NOZZLE NUMBER | QUANTITY OF FLIGHT DEVIATION FROM IDEAL POSITION (ABSOLUTE EJECTION ACCURACY) [μm] |
|---|---|
| 1 | 0 |
| 2 | +1 |
| 3 | −2 |
| . | |
| . | |
| . | |
| 1438 | −4 |
| 1439 | 0 |
| 1440 | +3 |

FIG.11B

| NOZZLE NUMBER | QUANTITY OF RELATIVE FLIGHT DEVIATION (RELATIVE EJECTION ACCURACY) [μm] (QUANTITY OF FLIGHT DEVIATION FROM IDEAL POSITION FOR NOZZLE NUMBER N + 1 − QUANTITY OF FLIGHT DEVIATION FROM IDEAL POSITION FOR NOZZLE NUMBER N) |
|---|---|
| 1 | −1 |
| 2 | −3 |
| 3 | +1 |
| . | |
| . | |
| . | |
| 1438 | +4 |
| 1439 | +3 |
| 1440 | − |

| NOZZLE NUMBER | INFORMATION ABOUT ABSENCE OR PRESENCE OF EJECTION |
|---|---|
| 1 | 0 |
| 2 | 0 |
| 3 | 1 |
| . | |
| . | |
| . | |
| 1438 | 0 |
| 1439 | 1 |
| 1440 | 0 |

0: NORMAL EJECTION
1: NON-EJECTION (CLOGGING)

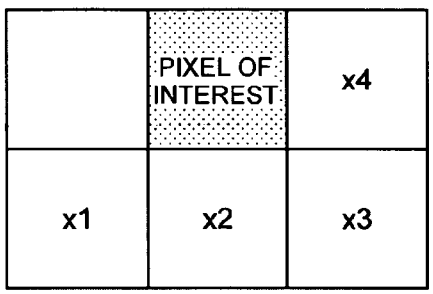

FIG.14A

| MATRIX ID | x1 | x2 | x3 | x4 | REMARKS |
|---|---|---|---|---|---|
| ID1 | 1 | 3 | 5 | 7 | |
| ID2 | 1 | 3 | 7 | 5 | WEIGHT BECOMES HEAVIER TOWARD DIAGONALLY RIGHT DOWN DIRECTION |
| ID3 | 1 | 5 | 3 | 7 | |
| ID4 | 1 | 5 | 7 | 3 | WEIGHT BECOMES HEAVIER TOWARD DIAGONALLY RIGHT DOWN DIRECTION |
| ID5 | 1 | 7 | 3 | 5 | |
| ID6 | 1 | 7 | 5 | 3 | |
| ID7 | 3 | 1 | 5 | 7 | NORMAL ERROR DIFFUSION MATRIX |
| ID8 | 3 | 1 | 7 | 5 | WEIGHT BECOMES HEAVIER TOWARD DIAGONALLY RIGHT DOWN DIRECTION |
| ID9 | 3 | 5 | 1 | 7 | |
| ID10 | 3 | 5 | 7 | 1 | WEIGHT BECOMES HEAVIER TOWARD DIAGONALLY RIGHT DOWN DIRECTION |
| ID11 | 3 | 7 | 1 | 5 | |
| ID12 | 3 | 7 | 5 | 1 | |
| ID13 | 5 | 1 | 3 | 7 | |
| ID14 | 5 | 1 | 7 | 3 | WEIGHT BECOMES HEAVIER TOWARD DIAGONALLY RIGHT DOWN DIRECTION |
| ID15 | 5 | 3 | 1 | 7 | |
| ID16 | 5 | 3 | 7 | 1 | WEIGHT BECOMES HEAVIER TOWARD DIAGONALLY RIGHT DOWN DIRECTION |
| ID17 | 5 | 7 | 1 | 3 | |
| ID18 | 5 | 7 | 3 | 1 | |
| ID19 | 7 | 1 | 3 | 5 | WEIGHT BECOMES HEAVIER TOWARD DIAGONALLY LEFT DOWN DIRECTION |
| ID20 | 7 | 1 | 5 | 3 | WEIGHT BECOMES HEAVIER TOWARD DIAGONALLY LEFT DOWN DIRECTION |
| ID21 | 7 | 3 | 1 | 5 | WEIGHT BECOMES HEAVIER TOWARD DIAGONALLY LEFT DOWN DIRECTION |
| ID22 | 7 | 3 | 5 | 1 | WEIGHT BECOMES HEAVIER TOWARD DIAGONALLY LEFT DOWN DIRECTION |
| ID23 | 7 | 5 | 1 | 3 | WEIGHT BECOMES HEAVIER TOWARD DIAGONALLY LEFT DOWN DIRECTION |
| ID24 | 7 | 5 | 3 | 1 | WEIGHT BECOMES HEAVIER TOWARD DIAGONALLY LEFT DOWN DIRECTION |

FIG.14B

ERROR DIFFUSION METHOD AND APPARATUS USING WEIGHTED VECTORS ALONG A DIAGONAL TO CORRECT FOR NON-IDEAL INK EJECTION

RELATED APPLICATIONS

This application claims priority to Japanese Patent Application Nos. 2005-020834 filed Jan. 28, 2005 and 2005-279404 filed Sep. 27, 2005 which are hereby expressly incorporated by reference herein in their entirety.

BACKGROUND

1. Technical Field

The present invention relates to a printing device used in a facsimile machine, a copying machine, and office automation equipment, a printing device control program, and a printing device control method, and more particularly, to a so-called ink-jet printing device configured to draw specific characters and images by ejecting fine particles of liquid inks of several colors onto a print sheet (recording member), a printing device control program, a printing device control method, a print data generation device, a print data generation program, and a print data generation method.

2. Related Art

Hereinafter, a printing device, in particular, a printer adopting the ink jet method (hereinafter, referred to as an ink-jet printer) will be described.

Ink-jet printers have been used extensively among not only offices but also general users as personal computers and digital cameras have come into widespread use because they are generally inexpensive and high-quality color printed matter can be obtained easily.

An ink-jet printer normally produces desired printed matter by moving a mobile body, called a carriage and provided with an ink cartridge and a print head in a single-piece design, to reciprocate over a medium used for printing (for example, a print sheet) in a direction perpendicular to the paper transportation direction, and simultaneously ejecting (discharging) dot-shaped particles of liquid inks from the nozzles provided to the print head to draw specific characters and images on the medium. By providing the carriage with ink cartridges of four colors including black (black, yellow, magenta, and cyan) and the print heads for respective colors, not only monochrome printing but also full color printing can be readily executed by combining the respective colors (color printing of six, seven, or eight colors is now available by using light cyan, light magenta, etc. in addition to the four colors).

In an ink-jet printer of a type that executes printing by moving the print heads on the carriage to reciprocate in a direction perpendicular to the paper transportation direction, the print heads have to reciprocate several tens to a hundred times or more to clearly print a full page. Hence, it has a drawback that printing takes a considerably long time in comparison with a printing device adopting another method, such as a laser printer using electrophotographic technology such as in a copying machine.

Meanwhile, an ink-jet printer of a type that omits the carriage by disposing a long print head of a size comparable to (or larger than) the width of the print sheet is known. Because there is no need to move the print head in the width direction of the print sheet in this ink-jet printer, a so-called single-scan (1-pass) printing can be achieved, which in turn enables printing as fast as a laser printer. In addition, the carriage to mount the print heads thereon and a driving system to move the carriage can be omitted. The housing of the printer can therefore be reduced in size and weight; moreover, there is another advantage that the printer becomes remarkably quiet. Incidentally, the ink-jet printer of the firstly-mentioned type is generally referred to as "a multi-pass printer", and the ink-jet printer of the secondly-mentioned type is generally referred to as "a line-head printer" or "a serial printer".

The print head indispensable to the ink-jet printer is provided with fine nozzles having a diameter of about 10 to 70 μm that are aligned at regular intervals in one line or in lines in more than one row along the printing direction. This configuration, however, may possibly give rise to a so-called flight deviation (or flight bend) phenomenon, which is an event that the ink ejecting direction of a part of the nozzles is inclined due to a manufacturing error or the landing position of a dot formed by a given nozzle is displaced from the ideal position because this nozzle is disposed at a position displaced from the ideal position. In addition, the characteristic varies from nozzle to nozzle, and for a nozzle having a considerable variance, a quantity of ink becomes too large or too small in comparison with an ideal quantity.

Defective printing referred to as the so-called banding (streak) phenomenon thus occurs in a portion printed by such failing nozzles, which possibly deteriorates the printing quality. In other words, once the flight deviation phenomenon occurs, a distance between dots ejected from adjacent nozzles becomes uneven. In a portion where the distance between adjacent dots becomes larger than usual, a white streak (when a print sheet is white) occurs, and in a portion where the distance between adjacent dots becomes smaller than usual, a dark streak occurs. Also, when the value of a quantity of ink does not coincide with the ideal value, a dark streak occurs in a portion printed by a nozzle having a larger quantity of ink and a white streak occurs in a portion printed by a nozzle having a smaller quantity of ink.

In particular, the banding phenomenon noticeably occurs more readily with a line-head printer in which the print head or a medium used for printing is fixed (1-pass printing) than with the multi-pass printer (serial printer) (for the multi-pass printer, a technique has been devised to make the banding less noticeable by exploiting its configuration to move the print head to reciprocate a number of times).

Such being the case, studies and developments have been conducted assiduously for hardware, such as improvements in the manufacturing technique and improvements in the design of the print head, to prevent a kind of defective printing caused by the banding phenomenon. However, it is difficult to provide a print head that is 100% free from the banding phenomenon because of the limits to hardware improvement due to manufacturing costs and current technical abilities.

Hence, as a technique for suppressing the banding phenomenon, printing control by software as described below is now used in addition to the improvements in the hardware as described above.

According to a first technique disclosed in the related art, for example, in JP-A-2002-19101 and JP-A-2003-136702, variances among nozzles and an ink ejection failure are addressed as follows. That is, variances among heads are addressed using a shading correction technique in a less dense portion, whereas the banding or variances are made less noticeable using an alternate color to the original color (for example, in the case of printing in black, cyan or magenta is used as an alternate color to black) in a dense portion.

According to a second technique disclosed in the related art, for example, in JP-2003-63043, a quantity of ejected ink is increased for adjacent nozzles corresponding to pixels in the neighborhood of a non-ejecting nozzle for a solid image (an image portion having a relatively large area in comparison with a line image, and it is a region densely covered with ink; however, there may be a case where it is not fully covered due to an edge effect), so that a solid image is formed using the nozzles as a whole.

According to a third technique disclosed in the related art, for example, in JP-A-5-30361, the banding phenomenon is avoided by absorbing a variance in the quantity of ink ejected from the nozzles by feeding back a quantity of variance in each nozzle to error diffusion.

According to a fourth technique disclosed in the related art, for example, in JP-A-2004-58284, assuming that there is a nozzle (N) under an abnormal ink ejection condition, record data corresponding to this failing nozzle (N) is appended to record data corresponding to neighboring nozzles (N−1) and (N+1) positioned in the neighborhood of the failing nozzle (N). The banding phenomenon can be avoided by compensating for the record data corresponding to the abnormal nozzle (N) in this manner.

However, the first technique in the related art for suppressing the banding phenomenon and variances using another color has a problem that the hue changes in a portion where this technique is applied. This technique is therefore unsuitable for printing that requires a high image quality and a high quality, such as printing of a color picture image.

In addition, when the method of avoiding the white streak phenomenon by distributing the information about the non-ejecting nozzle to nozzles on the right and left is adopted as a countermeasure against the flight deviation phenomenon, it is indeed possible to reduce a white streak; however, there is a problem that banding still occurs in a dense portion.

The second technique in the related art has no problem when a solid image is produced as printed matter. However, this technique cannot be used when halftone printed matter is produced. In addition, the method of filling fine lines using another color has no problem for use to a limited extent. However, for an image on which the color used as an alternate color is used continuously, the hue changes in part of the image. This technique therefore has the same problem as the first technique in the related art.

The third technique in the related art has difficulty solving a problem that the dot formation content has discrepancies, because complicated processing is required to enable appropriate feedback for solving such a problem.

The fourth technique in the related art has a problem that in a case where dots of different sizes are formed using nozzles in the neighborhood in the downstream processing after binarization, when the dots have a γ characteristic, there is a risk that the area grayscale is lost in the portion where this technique is applied.

SUMMARY

One advantage of some aspects of the invention is to provide a novel printing device, printing device control program, printing device control method, print data generation device, print data generation program, and print data generation method, wherein each can eliminate or make deterioration of print image quality almost unnoticeable.

Another advantage of some aspects of the invention is to provide a novel printing device, printing device control program, printing device control method, print data generation device, print data generation program, and print data generation method, wherein each can eliminate or make deterioration of print image quality resulting from the banding phenomenon attributed to the flight deviation phenomenon almost unnoticeable.

A further advantage of some aspects of the invention is to provide a novel printing device, printing device control program, printing device control method, print data generation device, print data generation program, and print data generation method, wherein each can eliminate or make deterioration of print image quality resulting from an ink ejection failure almost unnoticeable.

According to a first aspect of the invention, a printing device that prints an image on a medium used for printing using a print head having nozzles capable of forming dots includes: an image data acquisition portion that acquires image data having an M-value (M≧3) pixel value; a nozzle information storage portion that stores nozzle information indicating a characteristic of each nozzle; an error diffusion matrix storage portion that stores plural kinds of error diffusion matrices having different diffusion ratios of an error assigned to pixel data as diffusion targets; a pixel data selecting portion that selects specific pixel data in the image data; an N-value conversion processing portion that performs N-value conversion processing that is processing to covert the M-value (M≧3) pixel value indicated by the selected pixel data to an N (M>N≧2) value; an error diffusion portion that diffuses the error to pixel data that has not been subjected to the N-value conversion processing in the image data according to the error diffusion matrix by using a difference between a value of the selected pixel data and a value of the selected pixel data after the N-value conversion processing as the error, thereby updating pixel values in the image data; a print data generation portion that generates print data that defines information about a dot formation content of the nozzles corresponding to the image data after the N-value conversion processing; and a printing portion that prints the image on the medium using the print head according to the print data. The error diffusion portion selects a specific error diffusion matrix for each selected pixel data from the error diffusion matrix storage portion according to the nozzle information, and diffuses the error to the pixel data that has not been subjected to the N-value conversion processing according to the selected error diffusion matrix.

When configured in this manner, the image data acquisition portion is able to acquire image data having an M-value (M≧3) pixel value. The nozzle information storage portion is able to store nozzle information indicating the characteristic of each nozzle. The error diffusion matrix storage portion is able to store plural kinds of error diffusion matrices having different diffusion ratios of the error assigned to pixel data as diffusion targets. The pixel data selecting portion is able to select specific pixel data in the image data. The N-value conversion processing portion is able to perform the N-value conversion processing that is the processing to convert the M-value (M≧3) pixel value indicated by the selected pixel data to an N (M>N≧2) value. The error diffusion portion is able to diffuse the error to pixel data that has not been subjected to the N-value conversion processing in the image data according to the error diffusion matrix by using a difference between the value of the selected pixel data and the value of the selected pixel data after the N-value conversion processing as the error, thereby updating pixel values in the image data. The print data generation portion is able to generate print data that defines information about a dot formation content of the nozzles corresponding to the image data after the N-value conversion processing. The printing portion is able to print the image on the medium using the print head according to the print data.

Further, the error diffusion portion selects a specific error diffusion matrix for each selected pixel data from the error diffusion matrix storage portion according to the nozzle information, and diffuses the error to the pixel data that has not been subjected to the N-value conversion processing according to the selected error diffusion matrix.

It is thus possible, for example, to perform the error diffusion processing by switching to an error diffusion matrix of a kind appropriate to avoid the occurrence of the banding phenomenon as needed for each factor that causes the banding phenomenon of various kinds, for example, when suppressing deterioration of the printing quality caused by a white streak or a dark streak resulting from the banding phenomenon chiefly attributed to the characteristic of nozzles that occurs due to an ink ejection failure of a nozzle or the flight deviation phenomenon of a nozzle by which the dot forming position is displaced from the ideal position, or when suppressing deterioration of the printing quality, such as a white streak and a dark streak resulting from the banding phenomenon attributed to the γ characteristic of a dot formed by a nozzle. Hence, there can be achieved an advantage that deterioration of the printing quality, such as a white streak and a dark streak resulting from the banding phenomenon can be suppressed in an appropriate manner for each factor that causes the banding phenomenon.

The dot referred to herein means a single region on a print medium formed by ink that is ejected from one or more than one nozzle and lands on the print medium. It goes without saying that the area of the dot is never "0", and the dot has a certain size (area); moreover, plural kinds of dots that differ in size are present. It should be noted, however, that a dot formed by ejecting ink does not necessarily form a perfect circle. For example, when a dot is formed in a shape other than a perfect circle, for example, in an elliptical shape, an average diameter is deemed as the dot diameter. Alternatively, an equivalent dot in the shape of a perfect circle having an area equal to an area of a dot formed by ejecting a specific quantity of ink is assumed, and the diameter of the equivalent dot is deemed as the dot diameter. To strike dots having different densities separately, for example, methods as follows are possible: striking dots having the same size and different densities, striking dots having the same density and different sizes, and overstriking dots having the same density and different quantities of ejected ink to vary the densities. In a case where one ink droplet ejected from one nozzle splits and lands on the medium, it is assumed that a single dot is formed. In a case where two or more dots formed by two nozzles or one nozzle with a time interval unite with each other, it is assumed that two dots are formed. The same applies to aspects relating to a printing device control program, aspects relating to a printing device control method, aspects relating to a print data generation device, aspects relating to a print data generation program, aspects relating to a print data generation method, aspects relating to recording media having recorded the programs, and the description in the Description of Exemplary Embodiments column below.

The image data acquisition portion acquires image data inputted from an optical printing result read portion, such as a scanner, or passively or actively acquires image data stored in an external device via a network, such as the LAN or the WAN. Alternatively, the image data acquisition portion acquires image data from a recording medium, such as a CD-ROM and a DVD-ROM, via a driving device, such as a CD drive and a DVD drive equipped to the printing device, or acquires image data stored in the storage device equipped to the printing device. In short, the acquisition involves at least the input, obtainment, reception, and reading. The same applies to aspects relating to a printing device control program, aspects relating to a printing device control method, aspects relating to a print data generation device, aspects relating to a print data generation program, aspects relating to a print data generation method, aspects relating to recording media having recorded the programs, and the description in the Description of Exemplary Embodiments column below.

The nozzle information storage portion stores the nozzle information including information about a quantity of the flight deviation and information indicating the absence or presence of an ejection failure of each nozzle by any means at any time. The nozzle information storage portion may have stored the nozzle information previously, or it may store the nozzle information by an input from the outside when the printing device is activated without having pre-stored the nozzle information. The nozzle information can be stored at any timing as long as it is the timing at which the printing device is restored to a state stored during use. For example, before the printing device comes onto the market as a product, such as at the time of shipment from the factory, a quantity of displacement of the dot formation position and an ink ejection condition of nozzles forming the print head may be checked from the printing result by the print head using an optical printing result read portion, such as a scanner, so that the checking result is pre-stored as the nozzle information. Alternatively, a quantity of displacement of the dot formation position and an ink ejection condition of nozzles forming the print head may be checked during the use of the printing device in the same manner as the checking at the time of shipment from the factory, so that the checking result is stored as the nozzle information. Further, a quantity of displacement of the dot formation position and an ink ejection condition of the print head may be checked after the use of the printing device from the printing result by the print head using an optical printing result read portion, such as a scanner, periodically or at a predetermined time to address a change of the characteristic of the print head, so that the nozzle information can be updated by storing the checking result together with the data at the time of shipment from the factory or by writing the checking result over the data at the time of shipment. The same applies to aspects relating to a printing device control program, aspects relating to a printing device control method, aspects relating to a print data generation device, aspects relating to a print data generation program, aspects relating to a print data generation method, aspects relating to recording media having recorded the programs, and the description in the Description of Exemplary Embodiments column below.

The information about the dot formation content of the nozzles is made of information needed when dots are formed by a nozzle, such as information about the absence or presence of dots (whether dots are formed by the nozzle) and information about the sizes of dots when dots are formed (for example, one of three sizes: large, medium, and small) for each pixel value in the image data. For example, when there is only one forming size, it may be made of information about the absence or presence of dots alone.

As has been described, the banding phenomenon includes a printing failure in which a white streak and a dark steak occur simultaneously in the printing result due to the so-called flight deviation phenomenon caused by a nozzle whose dot forming position is displaced from the ideal forming position, a printing failure in which a white streak or a dark streak occurs in the printing result due to an inadequate quantity of ejected ink caused by a non-ejecting nozzle, and a printing failure in which a white streak or a dark streak occurs in the printing result due to the γ characteristic of a dot formed by the nozzle. The same applies to aspects relating to a printing device control program, aspects relating to a printing device control method, aspects relating to a print data generation device, aspects relating to a print data generation program, aspects relating to a print data generation method, aspects relating to recording media having recorded the programs, and the description in the Description of Exemplary Embodiments column below.

A white streak means a portion (region) in which a phenomenon that a distance between adjacent dots becomes wider than a specific distance due to the flight deviation phenomenon occurs continuously, which makes the color of the background of the print medium to appear noticeably as a streak. Likewise, a dark streak means a portion (region) in which a phenomenon that a distance between adjacent dots becomes shorter than a specific distance due to the flight deviation phenomenon occurs continuously, which makes the color of the background of the print medium invisible, or the color apparently becomes darker as the distance between dots becomes shorter, or a portion (region) where part of dots formed at displaced positions overlap on dots formed normally and the overlapped portion appears noticeably as a dark streak. A white streak may occur because of a nozzle having an insufficient quantity of ink, whereas a dark streak may occur because of a nozzle having an excessive quantity of ink. The same applies to aspects relating to a printing device control program, aspects relating to a printing device control method, aspects relating to a print data generation device, aspects relating to a print data generation program, aspects relating to a print data generation method, aspects relating to recording media having re-corded the programs, and the description in the Description of Exemplary Embodiments column below.

The error diffusion matrix means a matrix having stored information (relative position information) indicating the position (diffusion direction) of pixel data as diffusion targets with respect to the pixel data to be diffused and information about diffusion ratios assigned to the respective pixel data as diffusion targets, which is used when the M-value pixel data is converted to an N value by the N-value conversion processing and subsequently, so that a difference (error) between an N value after the conversion and an M value before the conversion is diffused (distributed) to pixel data that has not been subjected to the N-value conversion processing in the neighborhood of the pixel data of interest (this is generally referred to as the error diffusion method). There are plural kinds of error diffusion matrices, such as matrices having different shapes, matrices having different sizes (different numbers of diffusion targets), and matrices having different diffusion ratios. The same applies to aspects relating to a printing device control program, aspects relating to a printing device control method, aspects relating to a print data generation device, aspects relating to a print data generation program, aspects relating to a print data generation method, aspects relating to recording media having recorded the programs, and the description in the Description of Exemplary Embodiments column below.

The diffusion direction means, for example, a direction of a weight vector of the pixel of interest (selected pixel) according to the error diffusion matrix. In order to describe the weight vector, a fundamental vector is set first. As is shown in FIG. 22A, given the origin (0, 0) as the coordinate of the pixel of interest, (1, 0) as the coordinate of the pixel immediately to the right of the pixel of interest, and (0, 1) as the coordinate of the pixel immediately below the pixel of interest. Then, the fundamental vector of the pixel of interest can be expressed by Equations (1) and (2) below (shown also in FIG. 22A).

$$\vec{a} = (1,0) \qquad \text{(Equation 1)}$$

$$\vec{b} = (0,1) \qquad \text{(Equation 2)}$$

When the pixel of interest shown in FIG. 22A is converted to an N value according to the error diffusion matrix shown in FIG. 22B, a difference between the pixel value of the pixel of interest after the N-value conversion and the pixel value of the pixel of interest before the N-value conversion is calculated as an error. The error is then diffused to the neighboring pixels present at positions defined in the error diffusing matrix with weights defined in the error diffusion matrix shown in FIG. 22B (numerical values written in the cells immediately to the right, immediately below, at diagonally lower left, and at diagonally lower right with respect to the cell of the pixel of interest in FIG. 22B). The ratios (numerical values shown in the respective cells) of the error to be diffused to the neighboring pixels are referred to as the error diffusion ratios.

The weight vector is the fundamental vector multiplied with each weight. The weight vectors for pixels (1) through (4) shown in FIG. 22C are expressed by Equations (3) through (6) below, respectively. To be more specific, the fundamental vector multiplied by 7/16, which is the weight assigned to the pixel (1) shown in FIG. 22B, is the weight vector expressed by Equation (3) below. Likewise, the fundamental vector multiplied by 3/16, which is the weight assigned to the pixel (2), is the weight vector expressed by Equation (4) below. The fundamental vector multiplied by 5/16, which is the weight assigned to the pixel (3), is the weight vector expressed by Equation (5) below. The fundamental vector multiplied by 1/16, which is the weight assigned to the pixel (4), is the weight vector expressed by Equation (6) below.

$$\vec{①} = 7/16 \, \vec{a} \qquad \text{(Equation 3)}$$

$$\vec{②} = 3/16 \, (-\vec{a} + \vec{b}) \qquad \text{(Equation 4)}$$

$$\vec{③} = 5/16 \, \vec{b} \qquad \text{(Equation 5)}$$

$$\vec{④} = 1/16 \, (\vec{a} + \vec{b}) \qquad \text{(Equation 6)}$$

The diffusion direction is a direction indicated by a sum (the weight vector of the entire error diffusion matrix) of the weight vectors expressed by Equations (3) through (6) above, which is expressed by Equation (7) below.

$$\vec{M} = \vec{①} + \vec{②} + \vec{③} + \vec{④} \qquad \text{(Equation 7)}$$
$$= 5/16 \, \vec{a} + 9/16 \, \vec{b}$$

The opposite direction means a direction in which the direction indicated by the weight vector of the entire error diffusion matrix expressed by Equation (7) above is directly opposite. The opposite direction establishes a relation expressed by Equation (8) below between the weight vector of the entire error diffusion matrix and the directly opposite weight vector of the pixel of interest.

$$\vec{M'} = \alpha \vec{m} \qquad \text{(Equation 8)}$$

In other words, the weight vector expressed by Equation (7) above multiplied by a negative constant α is the weight vector having the directly opposite vector direction. The same applies to aspects relating to a printing device control program, aspects relating to a printing device control method, aspects relating to a print data generation device, aspects relating to a print data generation program, aspects relating to a print data generation method, aspects relating to recording media having recorded the programs, and the description in the Description of Exemplary Embodiments column below.

According to a second aspect of the invention, in the printing device of the first aspect, the nozzle information includes ejection failure information indicating absence or presence of an ink ejection failure for each nozzle.

When configured in this manner, a nozzle having an ink ejection failure can be readily identified. Hence, by preparing error diffusion matrices suitable for avoiding the banding phenomenon caused by an ink ejection failure, and performing the error diffusion processing by selecting an appropriate error diffusion matrix as needed, there can be achieved an advantage that deterioration of the printing quality, such as a white streak and a dark streak resulting from the banding phenomenon attributed to an ink ejection failure, can be suppressed appropriately.

An ink ejection failure means a state where a nozzle is incapable of ejecting ink in an ideal manner, for example, in a case where the nozzle is totally incapable of ejecting ink, a quantity of ejected ink is insufficient, a quantity of ejected ink is excessive, or the nozzle is not able to eject ink at the ideal position.

The absence or presence of an ink ejection failure with the nozzle can be detected, for example, by a CCD sensor provided to the printing device. Information indicating the absence or presence of an ink ejection failure can be therefore generated according to the detection result. The same applies to aspects relating to a printing device control program, aspects relating to a printing device control method, aspects relating to a print data generation device, aspects relating to a print data generation program, aspects relating to a print data generation method, aspects relating to recording media having recorded the programs, and the description in the Description of Exemplary Embodiments column below.

BRIEF DESCRIPTION OF THE DRAWINGS

The invention will be described with reference to the accompanying drawings, wherein like numbers reference like elements.

FIG. 11A is a view showing absolute ejection accuracy information (information about a quantity of flight deviation) for each nozzle.

FIG. 11B is a view showing relative ejection accuracy information for each nozzle.

FIG. 14A is a view showing one example of the configuration of an error diffusion matrix.

FIG. 14B is a view showing diffusion ratios set in respective error diffusion matrices and kinds of error diffusion matrices stored in an error diffusion matrix storage portion.

DESCRIPTION OF EXEMPLARY EMBODIMENTS

First Embodiment

Hereinafter, a first embodiment of the invention will be described with reference to the accompanying drawings. FIG. 1 through FIG. 14 are views showing the first embodiment of a printing device, a printing device control program, a printing device control method, a print data generation device, a print data generation program, and a print data generation method of the invention.

Figure 1:
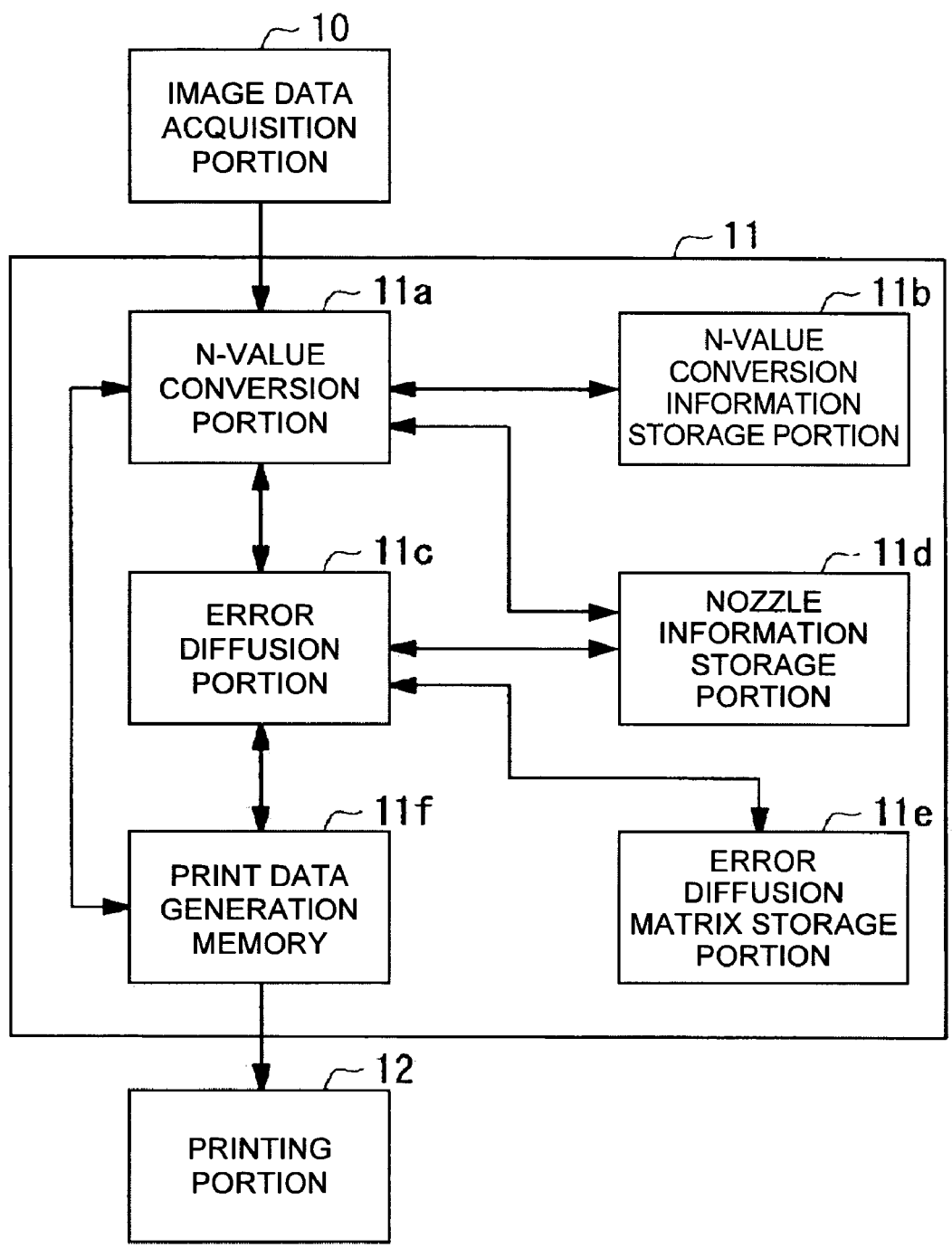
FIG. 1 is a block diagram showing the configuration of a printing device of the invention.

Firstly, the configuration of a printing device 100 of the invention will be described with reference to FIG. 1. FIG. 1 is a block diagram showing the configuration of the printing device 100 of the invention.

The printing device 100 is a line-head printing device. As is shown in FIG. 1, it comprises an image data acquisition portion 10 that acquires M-value ($M \geq 3$) image data from an external device or a storage medium, a print data generation portion 11 that generates print data used for a printing portion 12 described below to print an image of the image data on a print medium (for example, a print sheet) by performing N-value ($M > N \geq 2$) conversion processing on the image data acquired from the image data acquisition portion 10, and the printing portion 12 that prints the image of the image data onto the print medium according to the print data by the ink-jet method.

The image data acquisition portion 10 is furnished with a function of acquiring M-value (herein, $256 \geq M \geq 3$) image data for which the grayscale (luminance value) of respective colors (R, G, and B) for each pixel is represented by 8 bits (0 to 255). The image data acquisition portion 10 acquires such image data from: an external device via a network, such as the LAN and the WAN; a recording medium, such as a CD-ROM and a DVD-ROM, via an unillustrated driving device, such as a CD drive and a DVD drive, equipped to the printing device 100; or a storage device 70 equipped to the printing device 100 described below. Further, the image data acquisition portion 10 is able to exert a function of subjecting the M-value RGB data to color conversion processing to be converted to M-value CMYK (in the case of four colors) data corresponding to respective inks in a print head 200.

The print data generation portion 11 comprises an N-value conversion portion 11a, an N-value conversion information storage portion 11b, an error diffusion portion 11c, a nozzle information storage portion 11d, an error diffusion matrix storage portion 11e, and a print data generation memory 11f.

The N-value conversion portion 11a stores the image data that has been subjected to CMYK color conversion into the print data generation memory 11f. Also, it selects specific pixel data from the image data and converts the specific pixel data thus selected (hereinafter, referred to as the selected pixel data) to an N value according to an N-value conversion threshold, a dot number corresponding to each dot formation size, and a pixel value (for example, a luminance value) after the N-value conversion corresponding to each dot number, all of which are contained in the N-value conversion information read from the N-value conversion information storage portion 11b. Further, it calculates a difference between the pixel value before the N-value conversion and the pixel value after the N-value conversion of the selected pixel data, and transmits the difference as an error to the error diffusion portion 11c together with the information about the selected pixel data. The value after the N-value conversion takes either the dot number corresponding to the original pixel value or a numerical value "0" indicating not to form a dot. The N-value conversion portion 11a converts the data indicating the value after the N-value conversion to data that the printing portion 12 can interpret, and stores the converted data in the print data generation memory 11f by writing the converted data over the original pixel data that has been stored before (the converted data may be stored in another region instead of being written over).

The N-value conversion referred to herein means the processing to convert M-value ($M \geqq 3$) image data (having M kinds of pixel values (pixel data)) to N-value ($M > N \geqq 2$) data (having N kinds of numerical values). For example, in the case of binarization, a pixel value to be converted is compared with the threshold, and this pixel value is converted to one of two kinds of pre-set numerical values as follows: when the pixel value to be converted is equal to or greater than the threshold, this pixel value is converted to a numerical value "1", and when the pixel value to be converted is smaller than the threshold, this pixel value is converted to a numerical value "0". Hence, in the case of the N-value conversion, the M-value pixel value is compared with N kinds of threshold values, and it is converted to any one numerical value among pre-set N kinds of numerical values in response to the comparison result.

As has been described, the N-value conversion information storage portion 11b stores N-value conversion information made of an N-value conversion threshold corresponding to a dot formation size of each nozzle, the dot number corresponding to each dot formation size, a pixel value (for example, a luminance value) after the N-value conversion corresponding to each dot number, etc.

The error diffusion portion 11c reads out nozzle information corresponding to the selected pixel data from the nozzle information storage portion 11d according to the information and the error of the selected pixel data acquired from the N-value conversion portion 11a, and judges whether the nozzle corresponding to the selected pixel data is a failing nozzle according to the nozzle information. Upon judging that the nozzle in question is a failing nozzle, it selectively reads out a special error diffusion matrix for avoiding the banding phenomenon caused by this failing nozzle from the error diffusion matrix storage portion 11e. Meanwhile, upon judging that the nozzle in question is a normal nozzle having no trouble, it reads out a common error diffusion matrix prepared for a normal nozzle (hereinafter, referred to as the normal error diffusion matrix). By using the error diffusion matrix thus read, the error diffusion portion 11c diffuses (distributes) the error to the pixel data that has not been subjected to the N-value conversion processing in the neighborhood of the pixel corresponding to the selected pixel data in the image data stored in the print data generation memory 11f. The image data stored in the print data generation memory 11f is updated by diffusing the error to the pixel values as diffusion targets in this manner each time the selected pixel data is converted to an N value.

The error diffusion processing referred to herein is to diffuse an error on the same principle underlying the error diffusion method in the related art. For example, in the case of binarization processing where "128" is given as the threshold and N-value image data is converted to "0" when the pixel value is smaller than "128" and to "255" when the pixel value is equal to or greater than "128", assume that the pixel value of a selected pixel is "101", then "101" is converted to "0". A difference, "101", between "0" after the conversion and "101" before the conversion is deemed as an error and diffused to more than one outstanding pixel in the neighborhood according to a predetermined diffusion method. For example, a pixel immediately to the right of the selected pixel (for example, having the pixel value of "101") is converted to "0" as with the selected pixel by the normal binarization processing because it is also smaller than the threshold. However, by receiving an error of the selected pixel, for example, "27", the pixel value is increased to "128" and becomes equal to the threshold "128". The pixel value of this pixel is therefore converted to "256".

Also, the failing nozzle referred to herein includes all nozzles involved in the occurrence of the banding phenomenon, such as a nozzle having an ink ejection failure, for example, a nozzle incapable of ejecting ink or a nozzle that ejects an abnormal quantity of ink, as well as a nozzle that causes the flight deviation phenomenon due to the displacement of the dot forming position from the ideal position.

The nozzle information storage portion 11d stores nozzle information made of information indicating the correspondence between each nozzle N in the print head 200 provided to the printing portion 12 and respective pixel data in the image data, information indicating the absence or presence of an ink ejection failure for each nozzle N, and information indicating the characteristic of each nozzle N, such as information indicating a quantity of flight deviation of each nozzle N. By checking each nozzle N in the print head 200 as to the occurrence of the flight deviation phenomenon and the absence or presence of an ejection failure on the basis of the nozzle information, it is possible to judge whether each nozzle N is a failing nozzle. Moreover, it is possible to specify a failing nozzle N, for example, in which ordinal position on the print head 200 the failing nozzle N is present and to which pixel data in the image data the failing nozzle corresponds.

The error diffusion matrix storage portion 11e stores information about the pixel data as diffusion targets, and matrix data that defines diffusion ratios of the error assigned to respective pixel data as the diffusion targets in the form of plural kinds of error diffusion matrices having different diffusion ratios in this embodiment.

In this embodiment, plural kinds of diagonally weighted error diffusion matrices are stored as plural kinds of error diffusion matrices, in which the diffusion ratio is increased for pixel data corresponding to pixels as diffusion targets present in a diagonal direction with respect to the pixel corresponding to the selected pixel data in comparison with other pixel data as diffusion targets for use in the error diffusion processing of the selected pixel data involved in the banding phenomenon. Besides these matrices, plural kinds of normal error diffusion matrices for pixel data that is not involved in the banding phenomenon are also stored.

The print data generation memory 11f stores image data having CMYK color information acquired from the image data acquisition portion 10. The print data generation memory 11f also stores the selected pixel data converted to an N value by writing the converted selected pixel data over the original pixel data according to an instruction from the N-value conversion portion 11a, and also stores pixel data as diffusion targets to which the error of the selected pixel data has been diffused by writing such pixel data over the original pixel data according to an instruction from the error diffusion portion 11c. By updating the original pixel data by performing the N-value conversion processing and the error diffusion processing sequentially in this manner, all the pixel data in the image data acquired from the image data acquisition portion 10 is consequently converted to N values. Data that the printing portion 12 can interpret, that is, the print data, is thus generated on the memory. The print data is the data for printing used in the printing portion 12 of the ink jet method described below, that is, the data indicating whether a dot of a specific color and a specific size is formed or no dot is formed for each pixel data in the image data.

Figure 3:
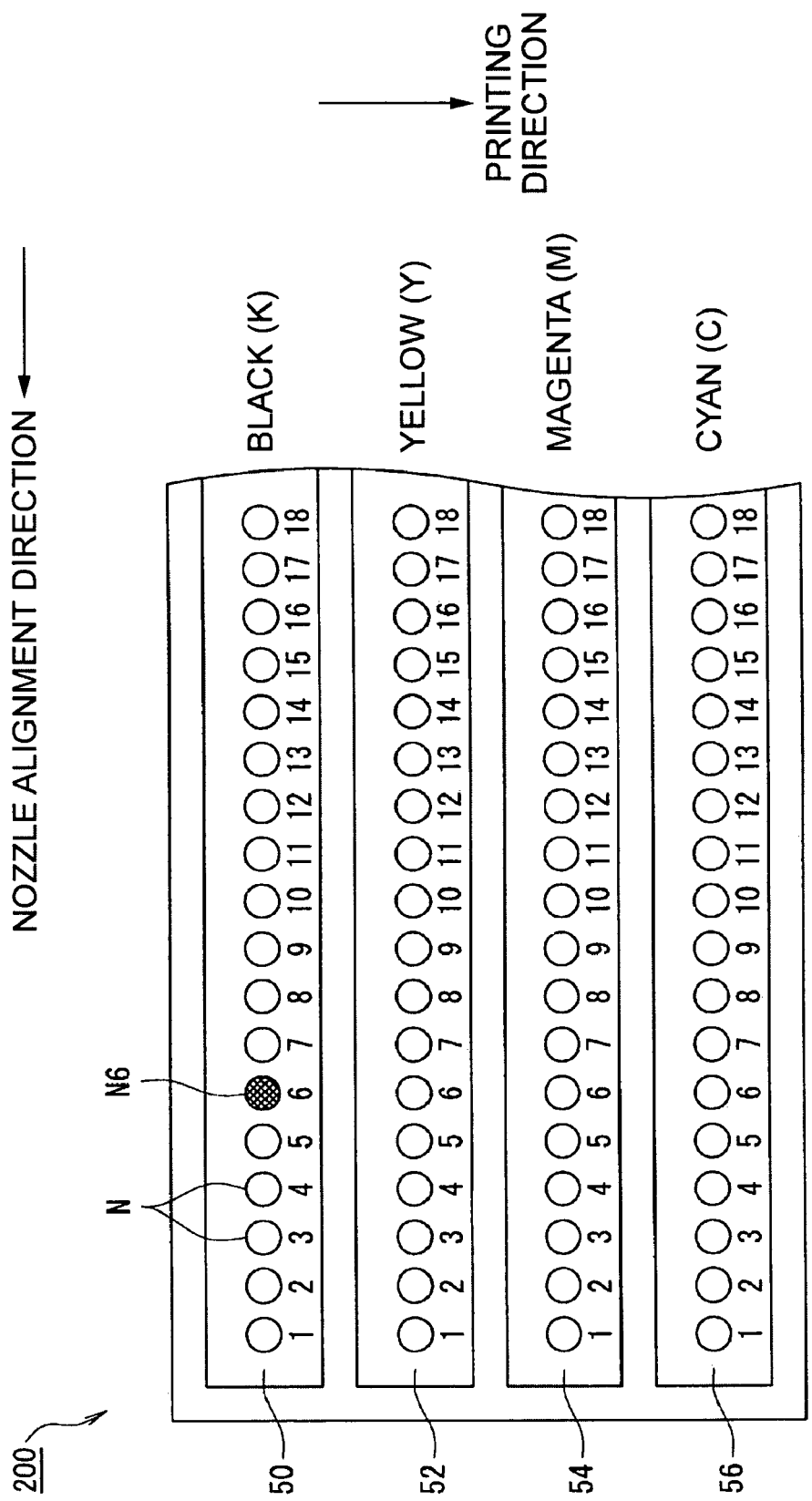
FIG. 3 is a partial enlarged bottom view showing the structure of a print head of the invention.
Figure 4:
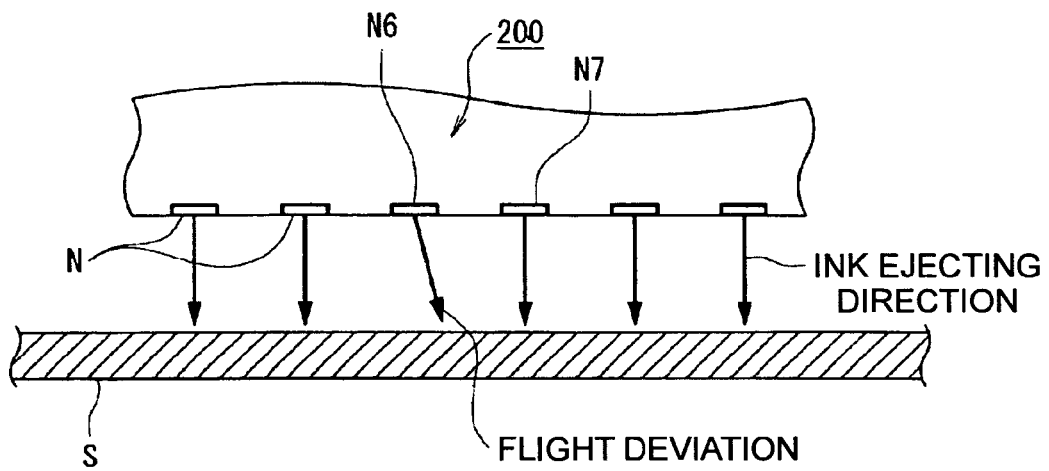
FIG. 4 is a partial enlarged side elevation of the print head.

FIG. 3 is a partial enlarged bottom view showing the structure of the print head 200 of the invention. FIG. 4 is a partial enlarged side elevation of the print head 200.

As is shown in FIG. 3, the print head 200 comprises four nozzle modules 50, 52, 54, and 56. In the black nozzle module 50, plural nozzles N (18 nozzles in the drawing) that eject black (K) ink alone are aligned linearly in the nozzle alignment direction. In the yellow nozzle module 52, plural nozzles N that eject yellow (Y) ink alone are aligned linearly in the nozzle alignment direction. In the magenta nozzle module 54, plural nozzles N that eject magenta (M) ink alone are aligned linearly in the nozzle alignment direction. In the cyan nozzle module 56, plural nozzles N that eject cyan (C) ink alone are aligned linearly in the nozzle alignment direction. As is shown in FIG. 3, the nozzle modules 50, 52, 54, and 56 are arrayed to form one unit in such a manner that the nozzles N labeled with the same numbers in these four nozzle modules are aligned in a straight line along the printing direction (a direction perpendicular to the nozzle alignment direction). That is to say, plural nozzles N that together form the respective nozzle modules are aligned linearly in the nozzle alignment direction, and the nozzles N labeled with the same numbers in the four nozzle modules are aligned linearly in the printing direction.

Further, FIG. 4 shows a state where the sixth nozzle from the left, the nozzle N6, in the black nozzle module 50 among the four nozzle modules 50, 52, 54, and 56 causes the flight deviation phenomenon, and ink is ejected onto a print medium S in a diagonal direction from the nozzle N6, thereby forming a dot on the print medium S in the vicinity of a dot ejected from a normal nozzle N7 adjacent to the nozzle N6 and formed on the print medium S.

The printing portion 12 is an ink-jet printer that forms an image made of a large number of dots on the print medium S by ejecting dot-shaped inks from the nozzle modules 50, 52, 54, and 56 provided to the print head 200 while moving either the print medium S or the print head 200 or both shown in FIG. 4. Besides the print head 200, the printing portion 12 includes an unillustrated print head moving mechanism (in the case of a multi-pass type) that moves the print head 200 over the print medium S to reciprocate in the width direction, an unillustrated paper transportation mechanism that moves the print medium (sheet of paper) S, and an unillustrated printing control mechanism that controls ejection of ink from the print head 200 according to the print data.

Figure 2:
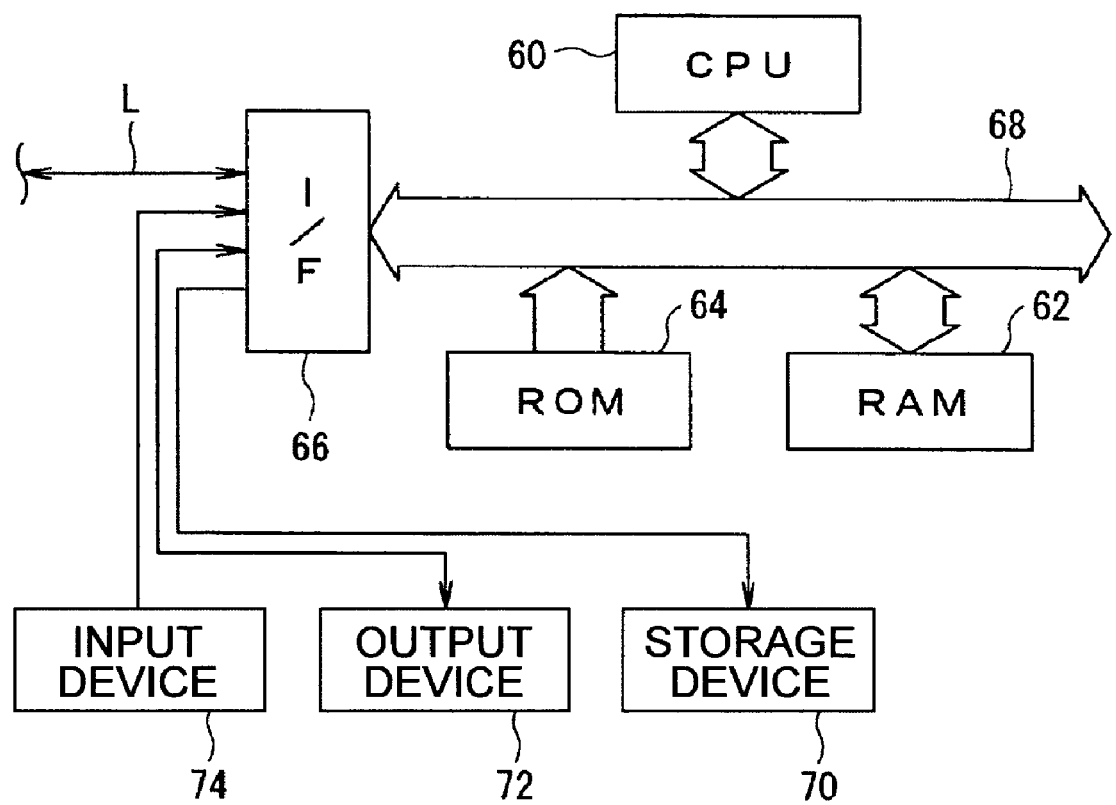
FIG. 2 is a view showing the hardware configuration of a computer system.

The printing device 100 achieves the respective functions, such as the image data acquisition portion 10, the print data generation portion 11, and the printing portion 12 by software, and therefore is provided with a computer system that runs the software to control the hardware needed to achieve the respective functions. According to the hardware configuration of the computer system as is shown in FIG. 2, a CPU (Central Processing Unit) 60 serving as an arithmetic and program control that performs respective kinds of control and computation processing, a RAM (Random Access Memory) 62 that forms a main storage device (Main Storage), and a ROM (Read Only Memory) 64 serving as a read-only storage device are interconnected via various kinds of inside/outside buses 68 comprising a PCI (Peripheral Component Interconnect) bus and an ISA (Industrial Standard Architecture) bus. In addition, an external storage device (Secondary Storage) 70 such as an HDD, an output device 72, such as a printing portion 20, a CRT, and an LCD monitor, and an input device 74, such as an operation panel, a mouse, a keyboard, and a scanner, and a network cable L to enable communications with an unillustrated printing instruction device, are connected to the buses 68 via an input/output interface (I/F) 66.

When the power supply is turned ON, a system program, such as BIOS, pre-installed in the ROM 64 down loads various kinds of exclusive-use computer programs pre-installed in the ROM 64 or various kinds of exclusive-use computer programs installed in the storage device 70 via a recording medium, such as a CD-ROM, a DVD-ROM, and a flexible disc (FD), or via a communication network, such as the Internet, to the RAM 62. Respective functions as described above are achieved on the software as the CPU 60 performs specific control and computation processing using various resources according to instructions written in the programs down loaded to the RAM 62.

Figure 5:
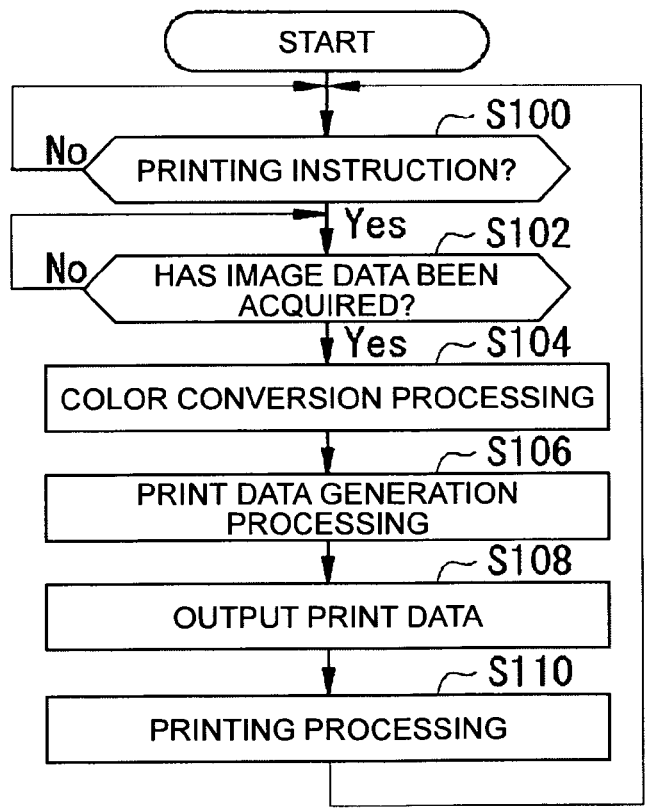
FIG. 5 is a flowchart detailing printing processing by the printing device.

Further, the printing device 100 activates a specific program pre-installed in a specific region of the ROM 64 by the CPU 60, and executes the printing processing detailed in the flowchart of FIG. 5 according to the program. As has been described, the print head 200 that forms dots is normally able to form dots of more than one color, for example, dots of four or six colors, simultaneously. However, for ease of description, descriptions will be given on the assumption that each dot is formed by a (monochrome) print head 200 of one color (monochrome image).

FIG. 5 is a flowchart detailing the printing processing by the printing device 100.

As is shown in FIG. 5, when the CPU 60 starts the printing processing, the printing device 100 proceeds to Step S100.

In Step S100, whether the image data acquisition portion 10 has received a printing instruction, either in the form of printing instruction information sent from a linked-external device via the network cable L or in the form of printing instruction information inputted via the input device 74, is judged. Upon judgment that the printing instruction has been received (Yes), the flow proceeds to Step S102; otherwise (No), the judgment processing is repeated until the printing instruction is received.

When the flow proceeds to Step S102, the image data acquisition portion 10 performs processing to acquire image data corresponding to the printing instruction from the external device, a recording medium, such as a CD-ROM and a DVD-ROM, or the storage device 70; such as an HDD, as described above. Subsequently, whether the image data has been acquired is judged. Upon judgment that the image data has been acquired (Yes), the flow proceeds to Step S104; otherwise (No), a response, "printing is impossible", is returned to the sender of the printing instruction. The flow then returns to Step S100 by canceling the printing processing for this printing instruction. The image data is the data made of plural M-value pixel data arrayed in a matrix fashion. The row direction coincides with the nozzle alignment direction of the print head 200, and the column direction coincides with the printing direction of the print head 200.

When the flow proceeds to Step S104, in a case where the M-value image data acquired in Step S102 is image data having color information other than CMYK, the image data acquisition portion 10 converts the image data to the image data having the color information of CMYK (hereinafter, referred to as CMYK image data), and transmits the CMYK image data to the print data generation portion 11. The flow then proceeds to Step S106. In other words, the image data having the color information other than CMYK is subjected to CMYK conversion before it is transmitted, whereas the CMYK image data is transmitted intact.

In Step S106, when the M-value CMYK image data is acquired from the image data acquisition portion 10, the print data generation portion 11 generates the print data by performing the N-value conversion and the error diffusion processing to the acquired image data. The flow then proceeds to Step S108.

In Step S108, the print data generation portion 11 outputs the print data generated in Step S106 to the printing portion 12. The flow then proceeds to Step S110.

In Step S110, the printing portion 12 executes printing processing according to the print data from the print data generation portion 11. The flow then returns to Step S100.

The print data generation processing in Step S106 will now be described in detail with reference to FIG. 6.

Figure 6:
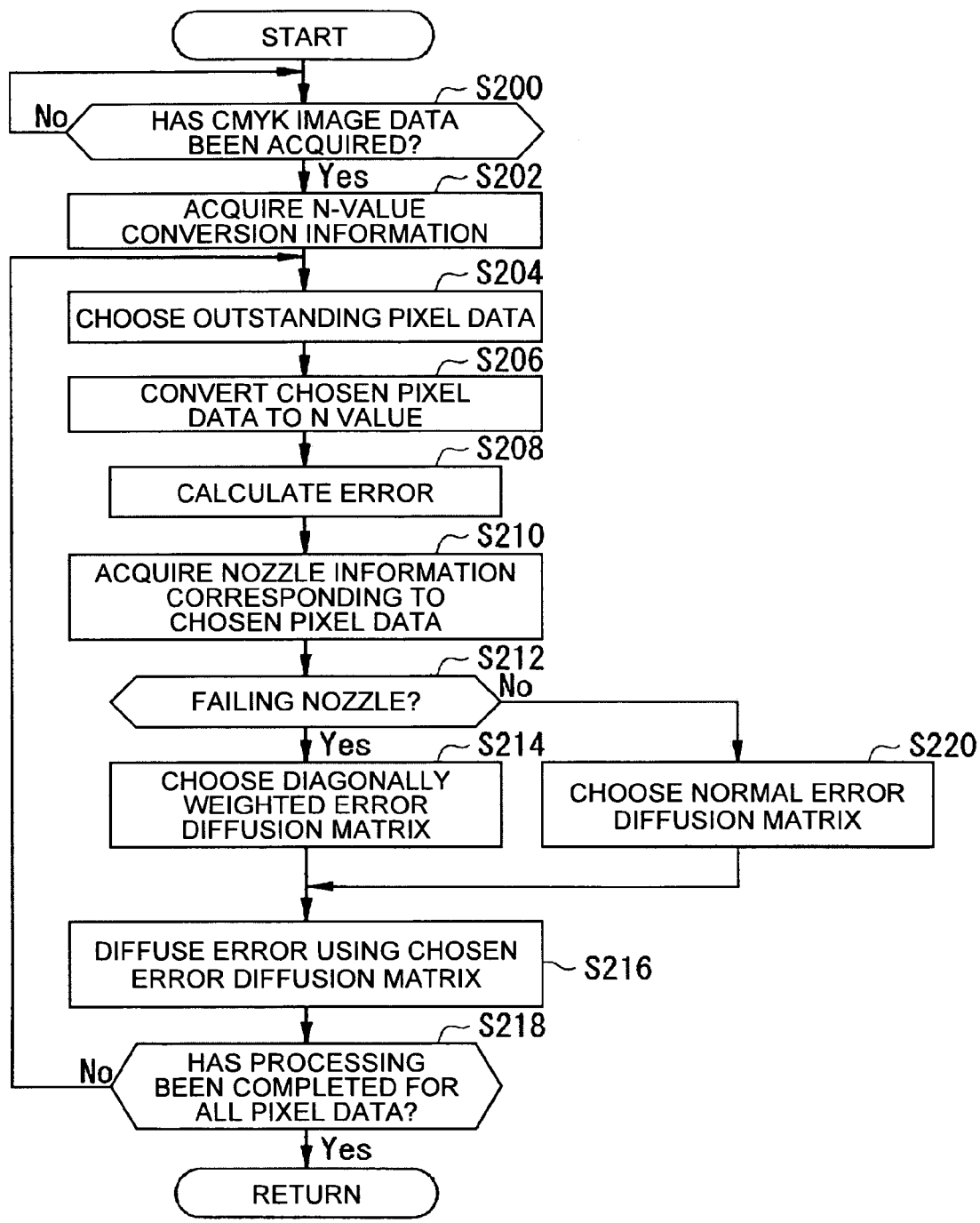
FIG. 6 is a flowchart detailing print data generation processing by the printing device according to a first embodiment of the invention.

FIG. 6 is a flowchart detailing the print data generation processing by the printing device 100.

The print data generation processing is the processing according to which the following are performed. That is, the selected pixel data is subjected to the N-value conversion processing, and whether the nozzle N corresponding to the selected pixel data is a failing nozzle is judged. An appropriate error diffusion matrix for the pixel data corresponding to the failing nozzle is selected from the error diffusion matrix storage portion lie according to the judgment result, and the error diffusion processing is performed using the error diffusion matrix thus selected. The print data is then generated according to the image data that has been subjected to the N-value conversion processing and the error diffusion processing. When Step S106 is performed, the flow proceeds to Step S200 as is shown in FIG. 6.

In Step S200, the N-value conversion portion 11*a* judges whether the M-value CMYK image data has been acquired from the image data acquisition portion 10. Upon judgment that the CMYK image data has been acquired (Yes), the acquired CMYK image is stored in the print data generation memory 11*f*. The flow then proceeds to Step S202. Otherwise (No), the judgment processing is repeated until the CMYK image data is acquired.

When the flow proceeds to Step S202, the N-value conversion portion 11*a* acquires N-value conversion information by reading out the N-value conversion information from the N-value conversion information storage portion 11*b*, and storing the read N-value conversion information in a specific region of the RAM 62. The flow then proceeds to Step S204.

In Step S204, the N-value conversion portion 11*a* selects pixel data that has not been subjected to the N-value conversion processing in the CMYK image data stored in the print data generation memory 11*f*. The flow then proceeds to Step S206.

In Step S206, the N-value conversion portion 11*a* converts the selected pixel data selected in Step S204 to an N value according to the N-value conversion information acquired in Step S202, and converts the value after the N-value conversion to data indicating the dot size formed by the nozzle for the value after the N-value conversion in the format that the printing portion 12 can interpret. The selected pixel data in the CMYK image data stored in the print data generation memory 11*f* is thus updated to the converted data. The flow then proceeds to Step S208.

In Step S208, the N-value conversion portion 11*a* calculates a difference between the pixel value before the N-value conversion and the pixel value after the N-value conversion of the selected pixel data according to the result of the N-value conversion in Step S206, and transmits the calculation result as an error to the error diffusion portion 11*c* together with information about the selected pixel data. The flow then proceeds to Step S210.

In Step S210, upon acquisition of the error calculated in Step S208 and the information about the selected pixel data corresponding to the error from the N-value conversion portion 11*a*, the error diffusion portion 11*c* acquires nozzle information corresponding to the selected pixel data by reading out the nozzle information from the nozzle information storage portion 11*d* and storing the read nozzle information in a specific region of the RAM 62. The flow then proceeds to Step S212. Thereafter, by searching for the nozzle information corresponding to the selected pixel data through the nozzle information stored in the RAM 62 first, it is possible to accelerate the acquisition processing of the pixel data using the same nozzle information.

In Step S212, the error diffusion portion 11*c* judges whether the nozzle N corresponding to the selected pixel data is a failing nozzle on the basis of the nozzle information acquired in Step S210. Upon judgment that the nozzle N is a failing nozzle (Yes), the flow proceeds to Step S214; otherwise (No), the flow proceeds to Step S220.

When the flow proceeds to Step S214, the error diffusion portion 11*c* selectively reads out the diagonally weighted error diffusion matrix from the error diffusion matrix storage portion 11*e*. The flow then proceeds to Step S216. In this embodiment, as has been described, plural kinds of matrix data having different diffusion ratios are stored in the error diffusion matrix storage portion 11*e*, and the diagonally weighted error diffusion matrix can be selected from these plural diagonally weighted error diffusion matrices in various manners, for example, it may be selected randomly or in a predetermined sequential order for each selected pixel data, or it may be selected appropriately in response to the condition of the failing nozzle corresponding to the selected pixel.

In Step S216, the error diffusion portion 11*c* diffuses the error of the selected pixel data acquired in Step S210 according to the error diffusion matrix selected in Step S214 or S220 to pixel data as diffusion targets that has not been subjected to the N-value conversion processing in the image data stored in the print data generation memory 11*f*, and thereby updates the pixel data as the diffusion targets. The flow then proceeds to Step S218.

In Step S218, the N-value conversion portion 11*a* judges whether the N-value conversion processing has been completed for all the pixel data. Upon judgment that the processing has been completed (Yes), the sequence of processing is ended and the device returns to the original processing; otherwise (No), the flow returns to Step S204.

Meanwhile, when the flow proceeds to Step S220 upon judgment that the nozzle corresponding to the selected pixel data is not a failing nozzle in Step S212, the error diffusion portion 11*c* selectively reads out the normal error diffusion matrix from the error diffusion matrix storage portion 11*e*. The flow then proceeds to Step S216. In this embodiment, as has been described, plural kinds of matrix data having different diffusion ratios are stored in the error diffusion matrix storage portion 11*e*, and the normal error diffusion matrix can be selected from these error diffusion matrices in various manners, for example, the one corresponding to each pixel data may be selected, or it may be selected randomly or in the predetermined sequential order for each selected pixel data.

The operation of this embodiment will now be described with reference to FIG. 7 through FIG. 14.

Figure 7:
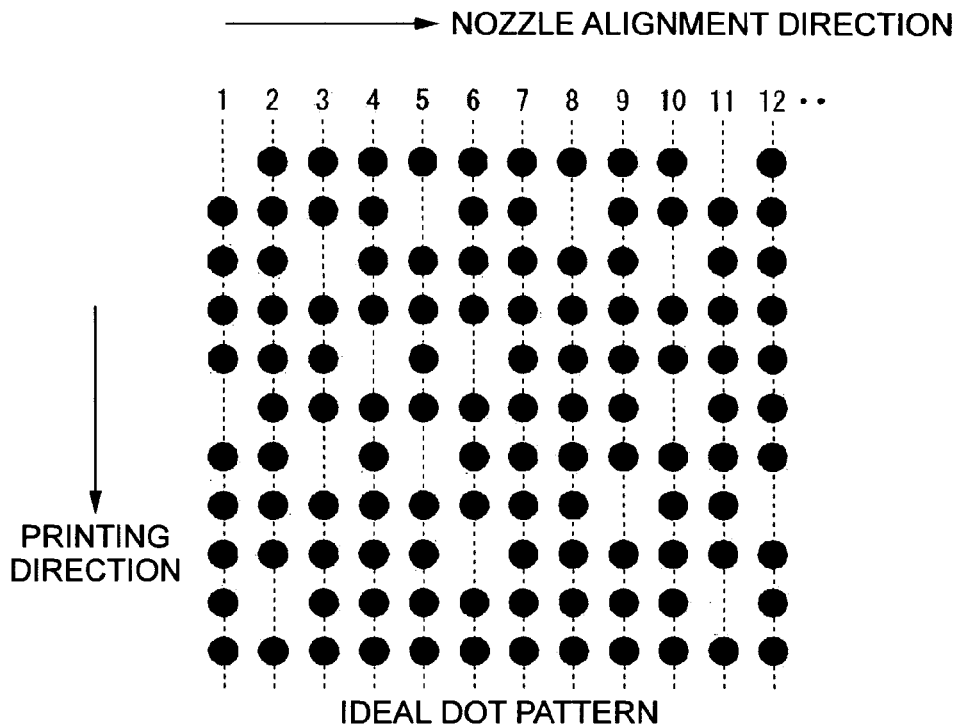
FIG. 7 is a view showing one example of a dot pattern formed by a black nozzle module alone having no failing nozzle that causes the flight deviation.
Figure 8:
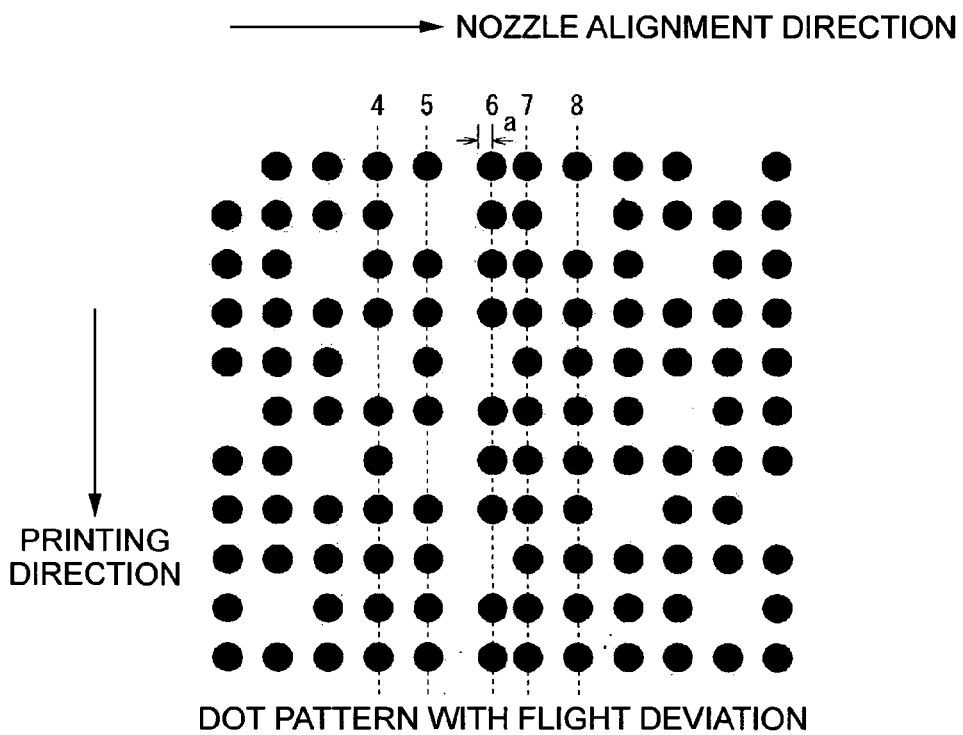
FIG. 8 is a view showing one example of a dot pattern formed by the black nozzle module having a nozzle that causes the flight deviation phenomenon.
Figures 9, 10:
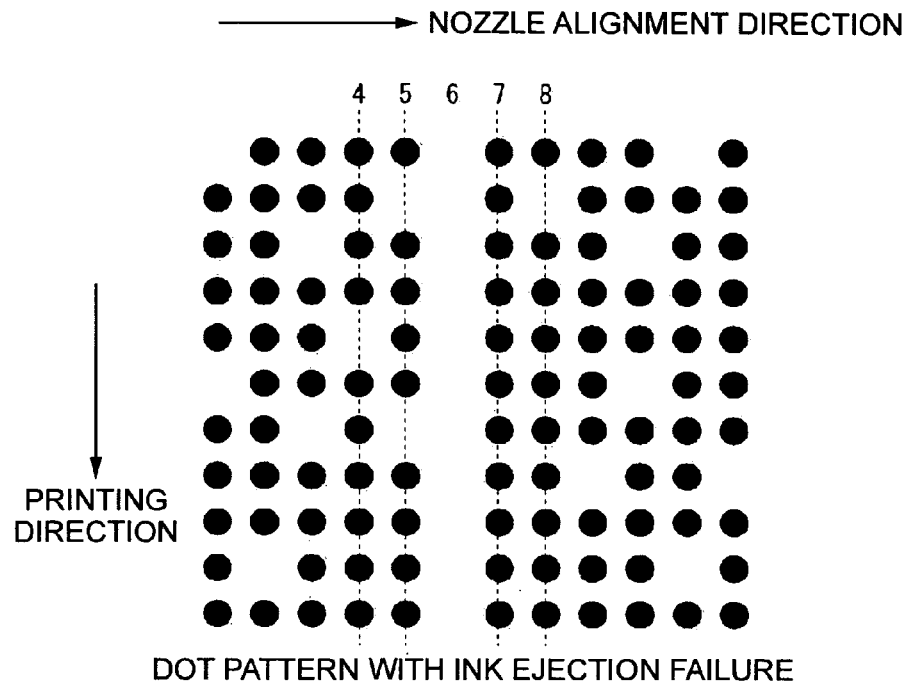
FIG. 9 is a view showing one example of a dot pattern formed by the black nozzle module having a nozzle that has an ink ejection failure (herein, non-ejection).
FIG. 10 is a view showing one example of information about an N value and information about the threshold for each N value regarding a dot size.
Figures 12, 13:
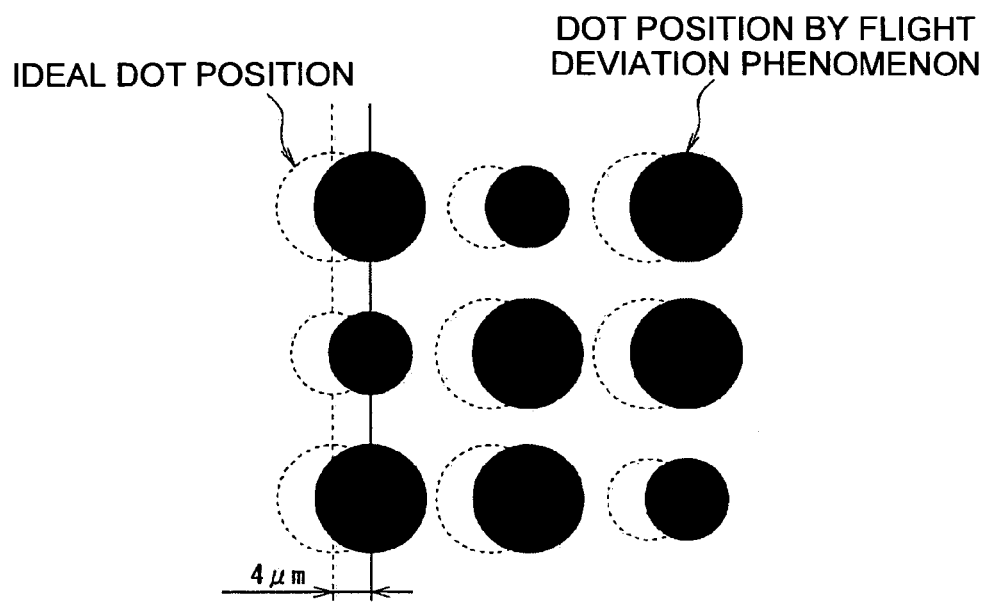
FIG. 12 is a view used to describe the reason why the relative ejection accuracy information is necessary.
FIG. 13 is a view showing the absence or presence of an ejection failure (herein, non-ejection) for each nozzle.

FIG. 7 is a view showing one example of a dot pattern formed by the black nozzle module 50 alone having no so-called failing nozzle. FIG. 8 is a view showing one example of a dot pattern formed by the black nozzle module 50 when the nozzle N6 causes the flight deviation phenomenon. FIG. 9 is a view showing one example of a dot pattern formed by the black nozzle module 50 when the nozzle N6 has an ink ejection failure (in the drawing, non-ejection). FIG. 10 is a view showing one example of information about an N value and information about the threshold for each N value regarding the dot size. FIG. 11A is a view showing absolute ejection accuracy information (information about a quantity of flight deviation) for each nozzle. FIG. 11B is a view showing relative ejection accuracy information for each nozzle. FIG. 12 is a view used to describe the reason why the relative ejection accuracy information is necessary. FIG. 13 is a view showing the absence or presence of an ejection failure (in the drawing, non-ejection) for each nozzle. FIG. 14A is a view showing one example of the configuration of the error diffusion matrix. FIG. 14B is a view showing the diffusion ratios of the respective error diffusion matrices and the kinds of error diffusion matrices stored in the error diffusion matrix storage portion 11*e*.

As is shown in FIG. 7, the banding phenomenon, such as a white streak and a dark streak, resulting from displacement of nozzle intervals will not occur in the dot pattern formed by the black nozzle module 50 having no failing nozzle.

On the contrary, as is shown in FIG. 8, in the printing result by the black nozzle module 50 having a nozzle that causes the flight deviation, dots formed by the nozzle N6 is displaced by a distance a toward dots formed by a normal nozzle N7 immediately to the right of the nozzle N6. Consequently, a white streak occurs between dots formed by the nozzle N6 and dots formed by a nozzle N5 immediately to the left of the nozzle N6.

In a case where the nozzle modules 52, 54, and 56 corresponding to other colors are used instead of the black nozzle module 50, as has been described, dots formed by the nozzle N6 and dots formed by the nozzle N7 immediately to the right come closer by the distance a as dots formed by the nozzle N6 are displaced by the distance a due to the flight deviation. Dots formed by these nozzles therefore become denser (dots may overlap), and this portion appears noticeably as a dark streak. The quality of the printed matter is thus deteriorated considerably.

As is shown in FIG. 9, dots that should have been formed are not formed due to an ink ejection failure (non-ejection) of the nozzle N6, and a white streak occurs between dots formed by the nozzle N5 and dots formed by the nozzle N7.

The white streak becomes more noticeable in the printed matter printed at a uniform density, and in particular, in a combination of a white print sheet and black ink having a significant difference in density. The quality of the printed matter is thus deteriorated extremely.

The printing device 100 according to this embodiment of the invention becomes able to produce print data to make a white streak or a dark streak less noticeable by subjecting the pixel data corresponding to a nozzle that causes the flight deviation or a nozzle having an ejection failure, that is, a failing nozzle to the error diffusion processing using the diagonally weighted error diffusion matrix as described above.

Initially, in the printing device 100, upon receipt of the printing instruction information from an external device (Step S100), the image data acquisition portion 10 acquires M-value image data corresponding to the printing instruction information from the external device as the sender of the printing instruction information (Step S102). When the acquired image data has color information other than CMYK, the image data is converted to M-value CMYK image data, and the CMYK image data is transmitted to the print data generation portion 11 (Step S104). Meanwhile, upon acquisition of the CMYK image data from the image data acquisition portion 10, the print data generation portion 11 starts to perform the print data generation processing (Step S106).

In the print data generation processing, the N-value conversion portion 11*a* first acquires the CMYK image data from the image data acquisition portion 10, and then stores the CMYK image data thus acquired in the print data generation memory 11*f* (Step S200). Subsequently, the N-value conversion portion 11*a* reads out the N-value conversion information from the N-value conversion information storage portion 11*b*, and stores the read N-value conversion information in a specific region of the RAM 62 (Step S200).

Upon acquisition of the N-value conversion information, the N-value conversion portion 11*a* selects pixel data that has not been subjected to the N-value conversion processing from the CMYK image data stored in the print data generation memory 11*f* (Step S204). The N-value conversion portion 11*a* then converts the value of the M-value selected pixel data to an N value according to the acquired N-value conversion information. Also, it converts the value after the N-value conversion to data indicating the dot number of a dot formed by the nozzle for this value after the N-value conversion in the format that the printing portion 12 can interpret. The selected pixel data in the CMYK image data stored in the print data generation memory 11*f* is thus updated to the converted data (Step S206).

In this embodiment, the N-value conversion is performed as follows. In a case where the original pixel value (luminance value (or density value)) of the selected pixel data is 8 bits with 256 grayscale levels, as is shown in FIG. 10, when the original pixel value is smaller than "32", then the pixel value is converted to "0", and "7" is given as the N value corresponding to the dot number. When the original pixel value is equal to "32" or greater and smaller than "64", the pixel value is converted to "36", and "6" is given as the N value corresponding to the dot number. When the original pixel value is equal to or greater than "64" and smaller than "96", the pixel value is converted to "73", and "5" is given as the N value corresponding to the dot number. Likewise, when the original pixel value is equal to or greater than "96" and smaller than "128", the pixel value is converted to "109", and "4" is given as the N value corresponding to the dot number. When the original pixel value is equal to or greater than "128" and smaller than "159", the pixel value is converted to "146", and "3" is given as the N value corresponding to the dot number. When the original pixel value is equal to or greater than "159" and smaller than "191", the pixel value is converted to "182", and "2" is given as the N value corresponding to the dot number. When the original pixel value is equal to or greater than "191" and smaller than "223", the pixel value is converted to "219", and "1" is given as the N value corresponding to the dot number. When the original pixel value is equal to or greater than "223", the pixel value is converted to "255", and "0" is given as the N value corresponding to the dot number.

The example described above is a case where the luminance value is adopted as the pixel value, and when the density value is adopted as the pixel value, the value takes values in inverse order of the luminance values (for example, a value obtained by subtracting each luminance value from "255").

Further, after the N-value conversion portion $11a$ converted the selected pixel data to the N value, it calculates a difference between the luminance value before the conversion and the luminance value after the conversion corresponding to the dot number of the selected pixel data as an error, and transmits the error thus calculated to the error diffusion portion $11c$ together with the information about the selected pixel data (Step S208).

Meanwhile, upon acquisition of the error and the information about the selected pixel data from the N-value conversion portion $11a$, the error diffusion portion $11c$ acquires nozzle information corresponding to the selected pixel data by reading out the nozzle information from the nozzle information storage portion $11d$ according to the acquired information about the selected pixel data and storing the nozzle information in a specific region of the RAM 62 (Step S210). The error diffusion portion $11c$ then judges whether the nozzle corresponding to the selected pixel data is a failing nozzle according to the nozzle information thus acquired (Step S212).

In this embodiment, the judgment processing of a failing nozzle is performed according to the absolute ejection accuracy information shown in FIG. 11A, the relative ejection accuracy information shown in FIG. 11B, and ejection absence or presence information shown in FIG. 13.

For example, according to FIG. 11A, when a quantity of flight deviation (absolute ejection accuracy) of dots formed by the nozzle corresponding to the selected pixel data from the ideal position is less than ±4 µm and the nozzle N ejects ink, the occurrence of flight deviation is not judged, and when a quantity of flight deviation is equal to or greater than ±4 µm, the occurrence of flight deviation is judged and the nozzle N corresponding to the selected pixel data is judged as being a failing nozzle.

However, even in a case where the absolute ejection accuracy is equal to or greater than ±4 µm, as is shown in FIG. 11B, the occurrence of flight deviation is not judged when a difference (relative ejection accuracy) between the ideal position of the nozzle N corresponding to the selected pixel data and the ideal position of a nozzle N+1 adjacent to the nozzle N is ±0 µm or less than a specific value.

The reason why the failing nozzle is judged using not only the absolute ejection accuracy but also the relative ejection accuracy as above is because as is shown in FIG. 12, for example, in a case where all of three sequentially aligned nozzles cause the flight deviation of the same quantity in the same direction, when the error diffusion processing is performed on the pixel data corresponding to these nozzles with the use of the special error diffusion matrix for avoiding banding (for example, the diagonally weighted error diffusion matrix), there is a possibility that the image quality in the printing result is deteriorated.

Further, according to the ejection absence or presence information indicating whether the nozzle ejects ink as shown in FIG. 13, when the ejection absence or presence information about the nozzle N corresponding to the selected pixel data shows "1", the nozzle is judged as being a failing nozzle incapable of ejecting ink. On the other hand, when the ejection absence or presence information shows "0" and the nozzle does not cause the flight deviation, the nozzle is judged as being a normal nozzle.

When the judgment processing as to whether the nozzle is a failing nozzle as described above ends, in a case where the nozzle N corresponding to the selected pixel data is judged as being a failing nozzle (branching to Yes in Step S212), the diagonally weighted error diffusion matrix is selected from the error diffusion matrix storage portion $11f$ (Step S214). On the other hand, when the nozzle N corresponding to the selected pixel data is judged as being a normal nozzle (branching to No in Step S212), a normal error diffusion matrix is selected from the error diffusion matrix storage portion $11f$ (Step S220).

As is shown in FIG. 14A, the error diffusion matrix of this embodiment is a matrix having the diffusion content as follows. That is, let $x1$ through $x4$ be error diffusion ratios assigned to four pixel data as diffusion targets, then the error is diffused to the pixel data as a diffusion target at the lower left with respect to the selected pixel data (pixel of interest in FIG. 14A) at the diffusion ratio, $x1$. The error is diffused to the pixel data as a diffusion target immediately below at the diffusion ratio, $x2$. The error is diffused to the pixel data as a diffusion target at the lower right at the diffusion ratio, $x3$. The error is diffused to the pixel data as a diffusion target immediately to the right at the diffusion ratio, $x4$.

The error diffusion matrix is selected as follows. That is, when the nozzle N corresponding to the selected pixel data is a failing nozzle, as is shown in FIG. 14B, the error diffusion matrix is selected from diagonally weighted error diffusion matrices identified with the matrix ID, such as those identified with ID2, ID4, and ID8. On the other hand, when the nozzle N corresponding to the selected pixel data is a normal nozzle, the error diffusion matrix is selected from the normal error diffusion matrices identified with the matrix ID, such as those identified with ID1, ID3, and ID5 through ID7.

Numerical values corresponding to the diffusion ratios $x1$ through $x4$ in FIG. 14B represent the diffusion ratios, and descriptions will be given using the diagonally weighted error diffusion matrix identified with ID2 as an example. As is shown in FIG. 14B, the diffusion ratios are set as follows in the matrix identified with ID2: $x1=1$, $x2=3$, $x3=7$, and $x4=5$. When the error diffused to the respective pixel data as the diffusion targets is calculated, these values are added up, $1+3+7+5=16$, which is used as the denominator. Then, the error to be diffused (value to be distributed) is calculated by multiplying the error by a numerator, which is one of the numerical values of $x1$ through $x4$. Hence, in the error diffusion processing, as is shown in FIG. 14A, $1/16$ of the error is diffused to the pixel data corresponding to $x1$, and $3/16$ of the error is diffused to the pixel data corresponding to $x2$. Likewise, $7/16$ of the error is diffused to the pixel data corresponding to $x3$, and $5/16$ of the error is diffused to the pixel data corresponding to x4. In other words, it is understood that 7/16 of the error, which is larger than the error diffused to any other pixel data, is diffused to the pixel data at the lower right with the use of the diagonally weighted error diffusion matrix identified with ID2. Meanwhile, as is shown in FIG. 14B, the diffusion ratios are set as follows in the normal error diffusion matrix identified with ID7: x1=3, x2=1, x3=5, and x4=7. When the normal error diffusion matrix identified with ID7 is compared with the diagonally weighted error diffusion matrix identified with ID2, it is understood that the error is diffused more in the diagonal direction (the diagonally right down direction) with the diagonally weighted error diffusion matrix identified with ID2. The same applies to a comparison between any other diagonally weighted error diffusion matrix and any other normal error diffusion matrix. That is to say, the error diffusion ratio is larger for the pixel data in the diagonal direction (pixel data corresponding to x1 or x3 in FIG. 14A) in any diagonally weighted error diffusion matrix than in any normal error diffusion matrix.

As has been described, as a manner in which the error diffusion matrix is selected from the error diffusion matrix storage portion 11f, one diagonally weighted error diffusion matrix or one normal error diffusion matrix is selected randomly for each selected pixel data among plural diagonally weighted error diffusion matrices and plural normal error diffusion matrices pre-stored in the error diffusion matrix storage portion 11f. Herein, the reason why the error diffusion matrix is selected randomly is because a better image quality can be obtained in the printing result by diffusing the error with the use of plural kinds of randomly selected error diffusion matrices than by performing error diffusion with the use of a fixed error diffusion matrix without variation.

As has been described, once the error diffusion matrix is selected for the selected pixel data, the errors calculated with the diffusion ratios set in the selected error diffusion matrix as shown in FIG. 14B are diffused to the pixel data as diffusion targets at the lower left, immediately below, at the lower right, and immediately to the right with respect to the selected pixel data (data of the pixel of interest in FIG. 14A) in the CMYK image data stored in the print data generation memory 11f as is shown in FIG. 14A. The CMYK image data stored in the print data generation memory 11f is thus updated.

Accordingly, the pixel value of pixel data that has not been subjected to the N-value conversion processing in the neighborhood of the selected pixel data is updated to the one that reflects the error caused by the N-value conversion as the result of the diffusion processing by the error diffusion portion 11c. Thereafter, the N-value conversion and the error diffusion processing with the use of the error diffusion matrix selected according to the nozzle information are performed successively on the outstanding pixel data updated as described above.

The print data generation processing ends when the N-value conversion and the error diffusion processing have been performed on all the pixel data in the CMYK image data stored in the print data generation memory 11f (branching to Yes in Step S218). In other words, each pixel value in the CMYK image data after the N-value conversion and the error diffusion processing stored in the print data generation memory 11f is now the data indicating the dot number corresponding to each dot formation size in the data format that the printing portion 12 can interpret, and it is the print data that can drive the print head 200 in the printing portion 12.

The print data generation portion 11 therefore outputs the print data thus generated to the printing portion 12, and deletes the print data that has been stored before in the print data generation memory 11f (Step S108).

On the other hand, upon acquisition of the print data outputted from the print data generation portion 11, the printing portion 12 forms (prints) dots of sizes corresponding to the respective dot numbers on the print medium using the black nozzle module 50 according to the print data thus acquired (Step S110).

For example, when the print head is of a type employing piezo actuators, a technical method of controlling the dot sizes can be readily achieved by controlling a quantity of ejected ink by varying a voltage applied to the piezo actuators.

As has been described, by performing the error diffusion processing using the diagonally weighted diffusion matrix on the pixel data in a portion where the banding phenomenon occurs due to a failing nozzle, a phenomenon visually acknowledged as a white streak or a dark streak can be made less noticeable than the dot pattern forming results shown in FIG. 8 and FIG. 9.

In the first embodiment, the image data acquisition portion 10 corresponds to the image data acquisition portion in the first aspect or the twenty-fifth aspect. The N-value conversion processing to convert the M-value pixel value of the selected pixel data to an N value by the N-value conversion portion 11a and the N-value conversion information storage portion 11b corresponds to the N-value conversion processing portion in the first aspect or the twenty-fifth aspect. The error diffusion portion 11c corresponds to the error diffusion portion in any one the first, fifth, sixth, twenty-fifth, twenty-ninth, and thirtieth aspects. The nozzle information storage portion 11d corresponds to the nozzle information storage portion in the first aspect or the twenty-fifth aspect. The error diffusion matrix storage portion 11e corresponds to the error diffusion matrix storage portion in any one of the first, tenth, eighteenth, twenty-fifth, thirty-second, and the fortieth aspects. The selecting processing of the outstanding pixel data by the N-value conversion portion 11a corresponds to the pixel data selecting portion in the first aspect or the twenty-fifth aspect. The processing to convert the data after the N-value conversion to data indicating the dot number of the dot formed by the nozzle in the format that the printing portion 12 can interpret by the N-value conversion portion 11a corresponds to print data generation portion in the first aspect or the twenty-fifth aspect. The printing portion 12 corresponds to the printing portion in the first aspect.

In the first embodiment, Steps S102 and S104 correspond to the acquiring of the image data in any one of the tenth, eighteenth, thirty-second, and fortieth aspects. Steps S202, S206, and S208 correspond to the performing of the N-value conversion processing in any one of the tenth, sixteenth, eighteenth, thirty-second, thirty-eighth, and fortieth aspects and to the generating of the print data in any one of the tenth, eighteenth, thirty-second, and fortieth aspects. Step S204 corresponds to the selecting of pixel data in any one of the tenth, eighteenth, thirty-second, and fortieth aspects. Steps S210 through S216, and S220 correspond to the diffusing of the error in any one of the tenth, fourteenth, fifteenth, sixteenth, eighteenth, twenty-second, twenty-third, thirty-second, thirty-sixth, thirty-seventh, fortieth, forty-fourth, and forty-fifth aspects. Step S110 corresponds to the printing in the tenth aspect or the eighteenth aspect.

Second Embodiment

Figure 15:
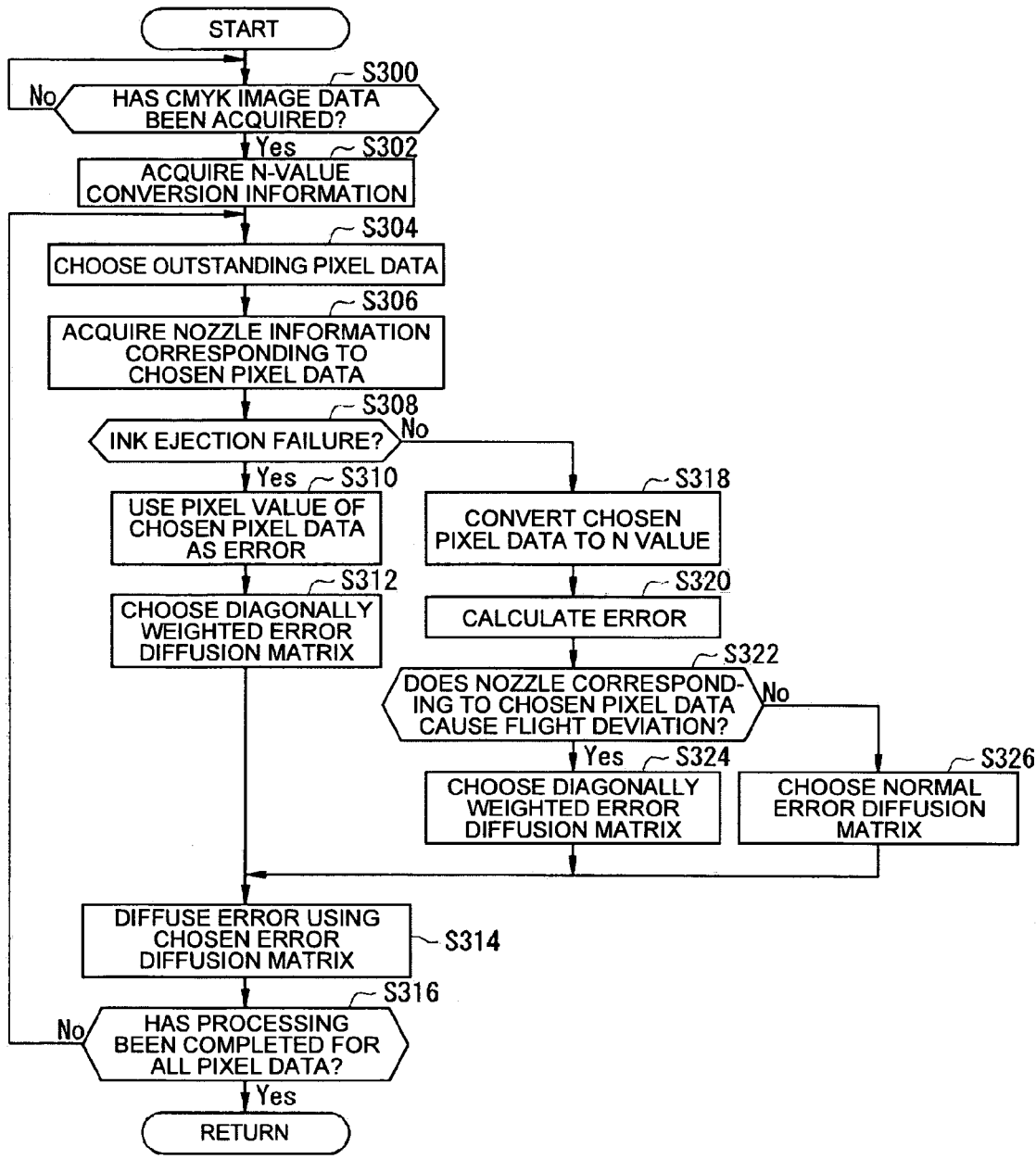
FIG. 15 is a flowchart detailing the print data generation processing by the printing device.

A second embodiment of the invention will now be described with reference to the accompanying drawings. FIG. 15 is a view showing the second embodiment of the printing device, the printing device control program, the printing device control method, the print data generation device, the print data generation program, and the print data generation method of the invention.

The configurations of the printing device and the computer system of the second embodiment are the same as their counterparts of the first embodiment shown in FIG. 1 and FIG. 2, respectively. In the second embodiment, the print data generation processing performed in Step S106 in FIG. 5 of the first embodiment is replaced with the one in FIG. 15.

The generation principle underlying the print data generation processing of FIG. 15 is the same as the one in the first embodiment except that the selected pixel data corresponding to a nozzle having an ink ejection failure is not converted to an N value, and instead the value of the original pixel data, which is deemed as an error, is diffused to the pixel data as diffusion targets in the neighborhood with the use of a special error diffusion matrix for avoiding the banding stored in the error diffusion matrix storage portion 11e. Hereinafter, only the portion different from the first embodiment will be described, and the description of the same portion will not be repeated herein.

Hereinafter, the print data generation processing in Step S106 in the second embodiment will be described in detail with reference to FIG. 15.

FIG. 15 is a flowchart detailing the print data generation processing by the printing device 100.

This print data generation processing is the processing according to which the followings are performed. Firstly, whether the nozzle N corresponding to the selected pixel data is a failing nozzle is judged. When the nozzle N is a failing nozzle that causes the flight deviation, an error is calculated by performing the N-value conversion. On the other hand, when the nozzle N is a failing nozzle having an ink ejection failure, the N-value conversion is not performed, and instead, the pixel value of the original pixel data is used as an error. Further, an appropriate error diffusion matrix for the pixel data corresponding to the failing nozzle is selected from the error diffusion matrix storage portion 11e according to the judgment result. The error diffusion processing is then performed using the error diffusion matrix thus selected. The print data is finally generated according to the image data having undergone the foregoing processing. When the print data generation processing is performed in Step S106, as is shown in FIG. 15, the flow proceeds to Step S300.

In Step S300, the N-value conversion portion 11a judges whether the M-value CMYK image data has been acquired from the image data acquisition portion 10 is judged. Upon judgment that the CMYK image data has been acquired (Yes), the acquired CMYK image data is stored in the print data generation memory 11f. The flow then proceeds to Step S302. Otherwise (No), the judgment processing is repeated until the CMYK image data is acquired.

When the flow proceeds to Step S302, the N-value conversion portion 11a acquires the N-value conversion information by reading out N-value conversion information from the N-value conversion information storage portion 11b and storing the read N-value conversion information in a specific region of the RAM 62. The flow then proceeds to Step S304.

In Step S304, the N-value conversion portion 11a selects pixel data that has not been subjected to the N-value conversion processing in the CMYK image data stored in the print data generation memory 11f. The flow then proceeds to Step S306.

In Step S306, the N-value conversion portion 11a acquires nozzle information corresponding to the selected pixel data by reading out the nozzle information from the nozzle information storage portion 11d and storing the read nozzle information in a specific region of the RAM 62. The flow then proceeds to Step S308.

In Step S308, the N-value conversion portion 11a judges whether the nozzle N corresponding to the selected pixel data has an ink ejection failure according to the nozzle information acquired in Step S306. Upon judgment that the nozzle N has an ink ejection failure (Yes), the flow proceeds to Step S310; otherwise (No), the flow proceeds to Step S318.

When the flow proceeds to Step S310, the N-value conversion portion 11a converts the pixel value of the selected pixel value to the lowest density value (for example, the density value of "0" or the luminance value of "255"), and generates data indicating "no dot" corresponding to the lowest density value in the format that the printing portion 12 can interpret. The selected pixel data in the CMYK image data stored in the print data generation memory 11f is then updated to the data thus generated. At the same time, a difference between the pixel value before the conversion and the pixel value after the conversion is calculated as an error, and the error and the information about the selected pixel data (including the information indicating the ejection failure) are transmitted to the error diffusion portion 11c. The flow then proceeds to Step S312.

In the description of Step S310 above, the pixel data corresponding to the dot formed by the nozzle having an ink ejection failure was converted to the lowest density value indicating "no dot" in FIG. 10 by way of example. The invention, however, is not limited to this configuration. The image in the printing result may be viewed locally, and when a dot size for an image in the converted portion is too small to be perceived by humans, the pixel data may be converted, for example, to a luminance value in the range of forming a dot as small as those with the dot number 1 or the dot number 2 shown in FIG. 10 instead of the value indicating "no dot".

In Step S312, upon acquisition of the error calculated in Step S310 and the information about the selected pixel data corresponding to the error from the N-value conversion portion 11a, the error diffusion portion 11c selectively reads out the diagonally weighted error diffusion matrix from the error diffusion matrix storage portion 11e. The flow then proceeds to Step S314.

In Step S314, the error diffusion portion 11c diffuses the error of the selected pixel data acquired in Step S312 or Step S322 with the use of the error diffusion matrix selected in Step S312 or Step S324 to the pixel data as diffusion targets in the image data stored in the print data generation memory 11f, and thereby updates the pixel data as diffusion targets. The flow then proceeds to Step S316.

In Step S316, the N-value conversion portion 11a judges whether the N-value conversion processing has been completed for all the pixel data. Upon judgment that the N-value conversion has been completed (Yes), the sequence of processing is ended and the device is returned to the original processing; otherwise (No), the flow returns to Step S304.

On the other hand, in a case where the flow proceeds to Step S318 because it is judged in Step S308 that the nozzle N corresponding to the selected pixel data has no ink ejection failure, the selected pixel data selected in Step S304 is converted to an N value according to the N-value conversion information acquired in Step S302. Also, the value after the N-value conversion is converted to data indicating the dot size to be formed in the format that the printing portion 12 can interpret. The selected pixel data in the CMYK image data stored in the print data generation memory 11f is thus updated to the converted data. The flow then proceeds to Step S320.

In Step S320, the N-value conversion portion 11a calculates a difference between the pixel value before the N-value conversion and the pixel value after the N-value conversion of the selected pixel data according to the result of the N-value conversion in Step S318, and transmits the calculation result as an error to the error diffusion portion 11c together with the information about the selected pixel data. The flow then proceeds to Step S322.

In Step S322, the error diffusion portion 11c judges whether the nozzle N corresponding to the selected pixel data is a failing nozzle that causes the flight deviation according to the nozzle information stored in the RAM 62. Upon judgment that the nozzle N is a failing nozzle (Yes), the flow proceeds to Step S324; otherwise (No), the step proceeds to Step S326.

When the flow proceeds to Step S324, the error diffusion portion 11c selectively reads out the diagonally weighted error diffusion matrix from the error diffusion matrix storage portion 11e. The flow then proceeds to Step S314.

On the other hand, when the flow proceeds to Step S326 because it is judged in Step S322 that the nozzle corresponding to the selected pixel data is not a failing nozzle, the error diffusion portion 11c selectively reads out the normal error diffusion matrix from the error diffusion matrix storage portion 11e. The flow then proceeds to Step S314.

The operation of the second embodiment will now be described.

In the second embodiment, too, as is shown in FIG. 8 of the first embodiment, dots formed by the nozzle N6 in the black nozzle module 50 are displaced by a distance a toward dots formed by the normal nozzle N7 immediately to the right, and as a result, a white streak occurs between dots formed by the nozzle N6 and dots formed by the nozzle N5 immediately to the left. Also, as is shown in FIG. 9, the nozzle N6 in the black nozzle module 50 has an ink ejection failure, and dots that should have been formed are not formed. As a result, a white streak occurs between dots formed by the nozzle N5 and dots formed by the nozzle N7.

In the printing device 100 according to the second embodiment of the invention, the same processing as the first embodiment is performed on the pixel data corresponding to the nozzle that causes the flight deviation, whereas the N-value conversion is not performed on the pixel data corresponding to the nozzle having an ejection failure, and instead, the error diffusion processing is performed with the use of the diagonally weight error diffusion matrix by deeming the pixel value itself as an error. The printing device 100 is therefore able to produce print data that can make a white streak or a dark streak less noticeable.

In the print data generation processing in the second embodiment, the N-value conversion portion 11a acquires the CMYK image data from the image data acquisition portion 10, and stores the acquired CMYK image data in the print data generation memory 11f (Step S300). Subsequently, the N-value conversion portion 11a reads out the N-value conversion information from the N-value conversion information storage portion 11b, and stores the read N-value conversion information in a specific region of the RAM 62 (Step S302).

Upon acquisition of the N-value conversion information, the N-value conversion portion 11a selects pixel data that has not been subjected to the N-value conversion processing in the CMYK image data stored in the print data generation memory 11f (Step S304). The N-value conversion portion 11a then reads out nozzle information corresponding to the selected pixel data from the nozzle information storage portion 11d and stores the read nozzle information in a specific region of the RAM 62 (Step S306). Subsequently, the N-value conversion portion 11a judges whether the nozzle N has an ink ejection failure according to the acquired nozzle information indicating the absence or presence of an ejection failure in the nozzle N corresponding to the selected pixel data as shown in FIG. 13 in the first embodiment (Step S308).

Upon judgment that the nozzle N corresponding to the selected pixel data has an ejection failure, the N-value conversion portion 11a converts the pixel value of the selected pixel data to the lowest density value (for example, the luminance value of "255"), and generates data indicating "no dot" corresponding to the lowest density value in the format that the printing portion 12 can interpret. The N-value conversion portion 11a then updates the selected pixel data stored in the print data generation memory 11f to the data thus generated. Also, the N-value conversion portion 11a calculates a difference between the pixel value before the conversion and the pixel value after the conversion (luminance value of "255") of the selected pixel data as the error for the error diffusion, and transmits the error and the information about the selected pixel data (including the information indicating the presence of an ejection failure) to the error diffusion portion 11c (Step S310).

On the other hand, upon acquisition of the error and the information (indicating the presence of an ejection failure) of the selected pixel data from the N-value conversion portion 11a, the error diffusion portion 11c selects the diagonally weighted error diffusion matrix from the error diffusion matrix storage portion 11f (Step S312). Subsequently, as is shown in FIG. 14A in the first embodiment, the error diffusion portion 11c diffuses the error to the pixel data as diffusion targets at the lower left, immediately below, at the lower right, and immediately to the right with respect to the selected pixel data (the data of the pixel of interest in FIG. 14A) in the CMYK image data stored in the print data generation memory 11f at the diffusion ratios set in the diagonally weighted error diffusion matrix as shown in FIG. 14B, thereby updating the CMYK image data (pixel data as diffusion targets) stored in the print data generation memory 11f (Step S314).

Upon judgment that the nozzle N corresponding to the selected pixel data has no ejection failure, the N-value conversion portion 11a converts the selected pixel data to an N value according to the N-value conversion information thus acquired, and converts the value after the N-value conversion to data indicating the dot number of the dot formed by the nozzle for this value after the N-value conversion in the format that the printing portion 12 can interpret, thereby updating the selected pixel data in the CMYK image data stored in the print data generation memory 11f (Step S318). Further, the N-value conversion portion 11a calculates an error between the luminance value before the conversion and the luminance value after the conversion corresponding to the dot number of the selected pixel data, and transmits the error thus calculated and the information about the selected pixel data to the error diffusion portion 11c (Step S320).

As with the first embodiment, the error diffusion portion 11c subsequently judges whether the nozzle N corresponding to the selected pixel data causes the flight deviation according to the absolute ejection accuracy information and the relative ejection accuracy information about the nozzle N shown in FIG. 11A and FIG. 11B, respectively (Step S322). Upon judging the occurrence of the flight deviation (branching to Yes in Step S322), the error diffusion portion 11c selects the diagonally weighted error diffusion matrix from the error diffusion matrix storage portion 11f (Step S324). On the other hand, upon judging that the nozzle N corresponding to the selected pixel data is a normal nozzle (branching to No in Step S322), the error diffusion portion 11c selects the normal error diffusion matrix from the error diffusion matrix storage portion 11f (Step S326).

Once the error diffusion matrix for the selected pixel data is selected in this manner, the errors calculated are diffused to the pixel data as diffusion targets at the lower left, immediately below, at the lower right, and immediately to the right with respect to the selected pixel data (data of the pixel of interest in FIG. 14A) in the CMYK image data stored in the print data generation memory 11f as is shown in FIG. 14A at the diffusion ratios set in the selected error diffusion matrix shown in FIG. 14B. The CMYK image data stored in the print data generation memory 11f is thus updated.

The print data generation processing ends when the N-value conversion and the error diffusion processing have been performed on all the pixel data in the CMYK image data stored in the print data generation memory 11f (branching to Yes in Step S316).

As has been described, by performing the N-value conversion and the error diffusion processing using the diagonally weighted error diffusion matrix on the pixel data in a portion where the banding phenomenon occurs due to the nozzle that causes the flight deviation, and by performing the error diffusion processing using the diagonally weighted error diffusion matrix not by subjecting the pixel data in a portion where the banding phenomenon occurs due to an ink ejection failure to the N-value conversion processing but by using the pixel value of the pixel data as an error, it is possible to make the phenomenon visually perceived as a white streak or a dark streak less noticeable than in the dot pattern forming results shown in FIG. 8 or FIG. 9.

In other words, in contrast to the first embodiment where the N-value conversion and the error diffusion processing are performed to the pixel data corresponding to the nozzle having an ink ejection failure on the assumption that dots are formed, in the second embodiment, the N-value conversion is not performed on the assumption that dots will not be formed and the grayscale of the pixel data in a portion where a dot is not formed is compensated with the pixel data in the neighborhood. Hence, the pixel value of the pixel data for which a dot is not formed is used as the error, and is diffused to outstanding pixel data in the neighborhood.

In the second embodiment, the image data acquisition portion 10 corresponds to the image data acquisition portion in the first aspect or the twenty-fifth aspect. The N-value conversion processing to convert an M-value pixel value of the selected pixel data to an N value by the N-value conversion portion 11a and the N-value information storage portion 11b corresponds to the N-value conversion portion in any one of the first, seventh, twenty-fifth, and thirty-first aspects. The error diffusion portion 11c corresponds to the error diffusion portion in any one of the first, fifth, seventh, twenty-fifth, twenty-ninth, and thirty-first aspects. The nozzle information storage portion 11d corresponds to the nozzle information storage portion in the first aspect or the twenty-fifth aspect. The error diffusion matrix storage portion lie corresponds to the error diffusion matrix storage portion in any one of the first, tenth, eighteenth, twenty-fifth, thirty-second, and fortieth aspects. The processing to select outstanding pixel data by the N-value conversion portion 11a corresponds to the pixel data selecting portion in the first aspect or the twenty-fifth aspect. The processing to convert the data after the N-value conversion to the data indicating the dot number of a dot formed by the nozzle in the format that the printing portion 12 can interpret and the processing to generate the data indicating "no dot" corresponding to the selected pixel data converted to the lowest density value in the format that the printing portion 12 can interpret by the N-value conversion portion 11a correspond to the print data generation portion in the first aspect or the twenty-fifth aspect. The printing portion 12 corresponds to the print portion in the first aspect.

In the second embodiment, Steps S102 and S104 correspond to the acquiring of the image data in any one of the tenth, eighteenth, thirty-second, and fortieth aspects. Steps S202, S206, and S208 correspond to the performing of the N-value conversion processing in any one of the tenth, sixteenth, eighteenth, twenty-fourth, thirty-second, thirty-eighth, fortieth, and forty-sixth aspects and to the generating of the print data in any one of the tenth, eighteenth, thirty-second, and fortieth aspects. Step S204 corresponds to the selecting of the pixel data in any one of the tenth, eighteenth, thirty-second, and fortieth aspects. Steps S210 through S216 and S220 correspond to the diffusing of the error in any one of the tenth, fourteenth, sixteenth, eighteenth, twenty-second, twenty-fourth, thirty-second, thirty-sixth, thirty-eighth, fortieth, forty-fourth, and forty-sixth aspects. Step S110 corresponds to the printing in the tenth aspect or the eighteenth aspect.

On example of the invention will now be described with reference to FIG. 16 through FIG. 19.

Figure 16:
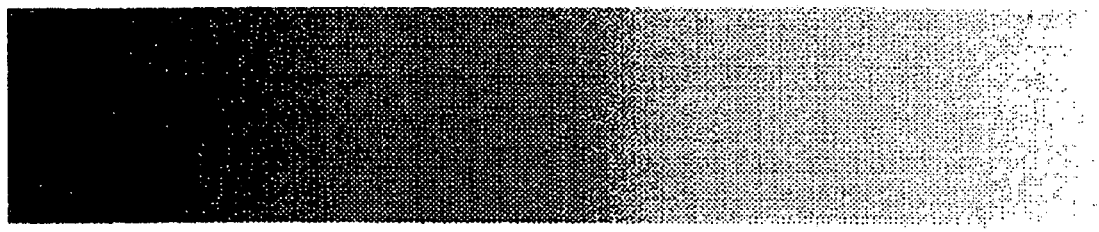
FIG. 16 is a gradation image used in one example.
Figure 17:
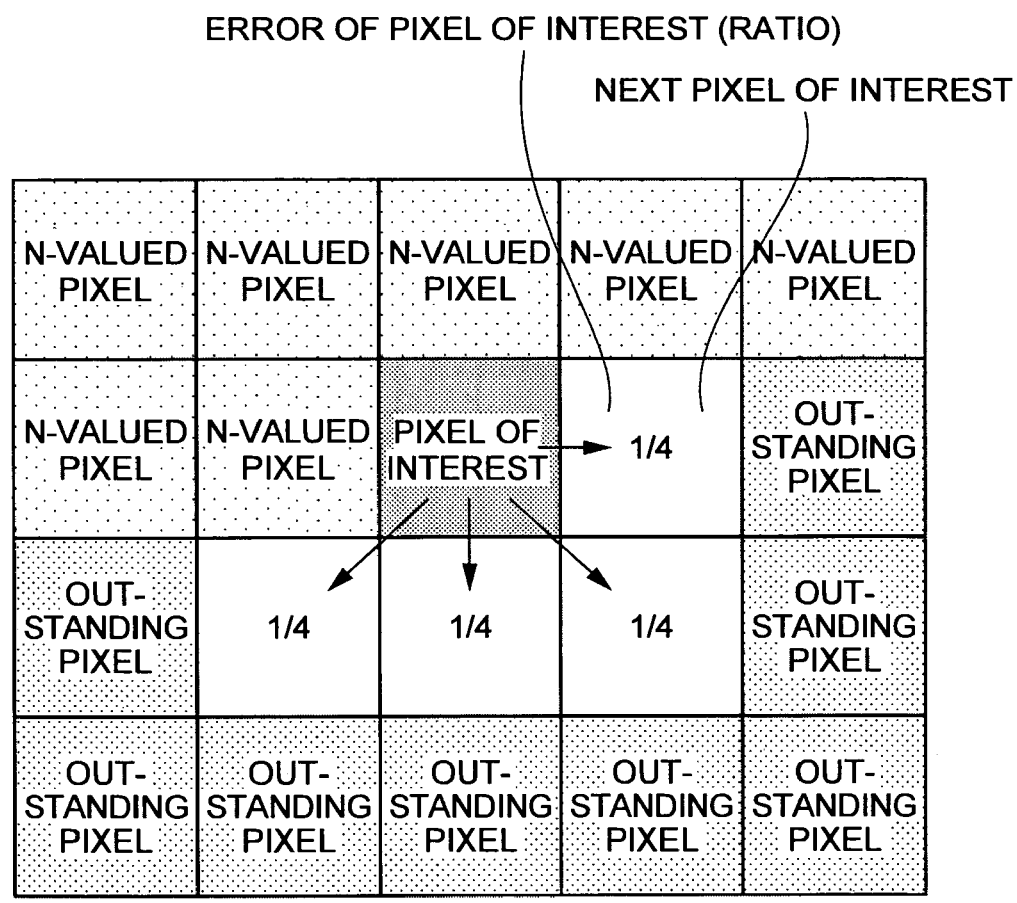
FIG. 17 is a view showing a normal error diffusion matrix used in the example.
Figure 18:
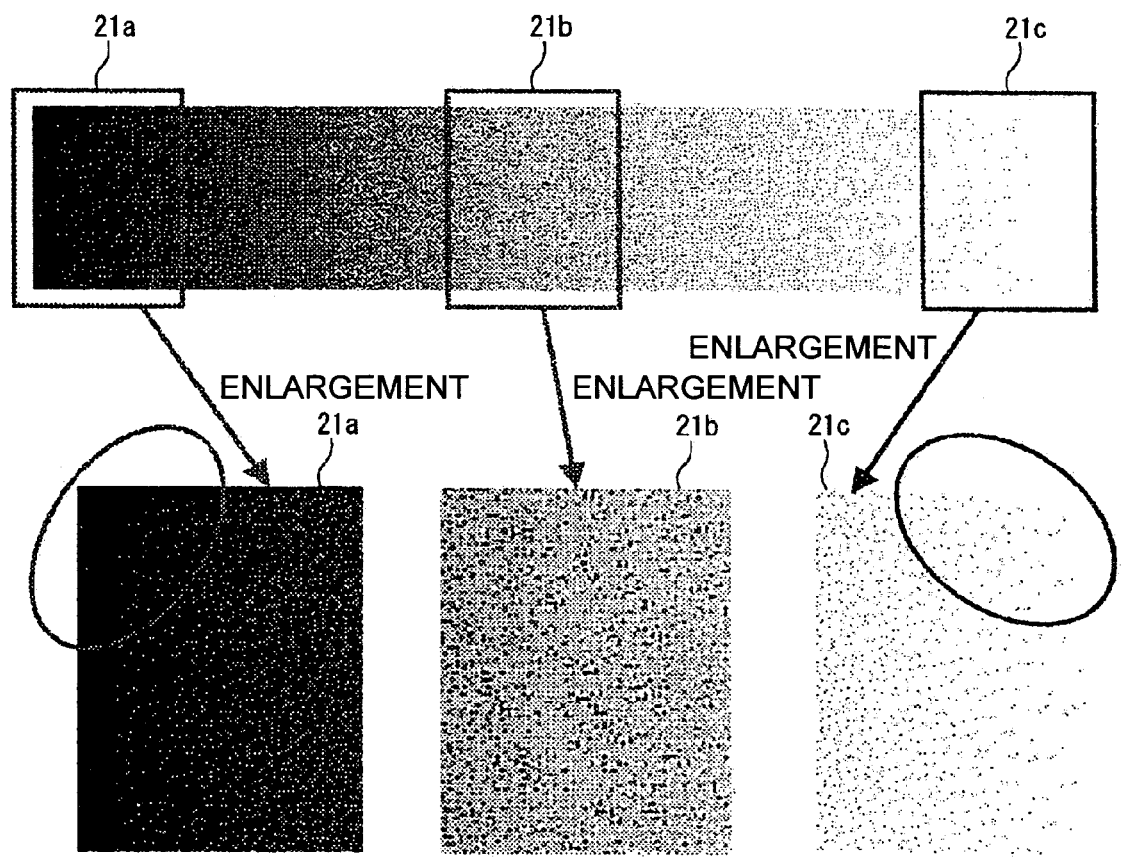
FIG. 18 is a view showing the result when the gradation image of FIG. 16 is subjected to quaternary conversion using the error diffusion matrix shown in FIG. 17.
Figure 19:
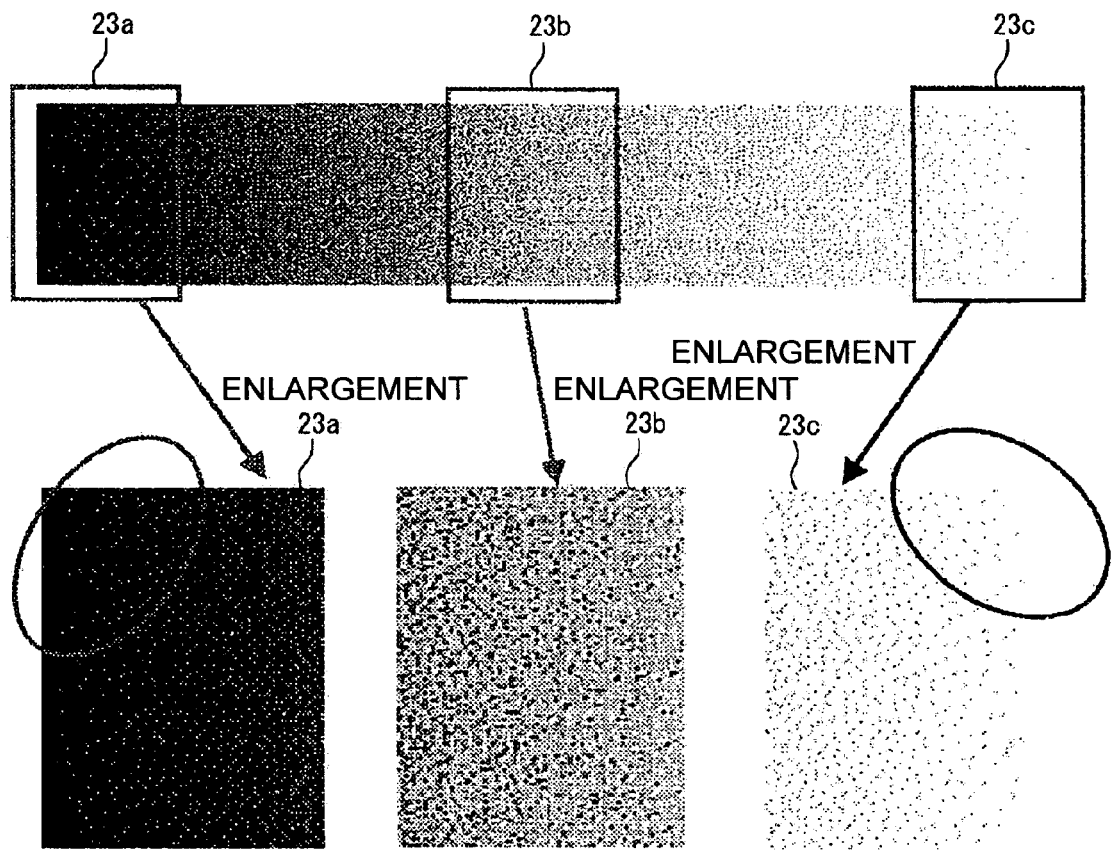
FIG. 19 is a view showing the result when the gradation image of FIG. 16 is subjected to quaternary conversion through an error diffusion processing technique of the invention.

FIG. 16 shows a gradation image used in this example. FIG. 17 is a normal error diffusion matrix used in the error diffusion technique in the related art. FIG. 18 is a view showing the result when the gradation image of FIG. 16 is subjected to the quaternary conversion using the error diffusion matrix by the technique in the related art shown in FIG. 17. FIG. 19 is a view showing the result when the gradation image of FIG. 16 is subjected to quaternary conversion using the error diffusion processing technique of the invention.

Firstly, the error diffusion technique in the related art will be described.

According to the error diffusion technique in the related art, in a case where pixel data is selected sequentially from left to right in each row of the image data, as is shown in FIG. 17, the error is diffused to outstanding pixel data immediately to the right of the selected pixel, as well as outstanding pixel data at the lower left, immediately below, and at the lower right, that is, a total of four pixel data. In short, the error diffusion technique in the related art diffuses the error more in the downward direction of the selected pixel data. FIG. 18 shows an image of the gradation image after the quaternary conversion by the technique in the related art. When image portion 21a through 21c in the gradation image after the quaternary conversion as shown in FIG. 18 are closely observed, the kinds of dots (dots have plural kinds of sizes) are not switched smoothly during printing in the image portion 21a because the diffusion direction of the error diffusion matrix used for the quaternary conversion has a characteristic to diffuse the error more in the downward direction. This gives rise to a delay in switching dots from one kind to another during printing. In particular, in a portion enclosed by a circle, dots are formed to flow in the diagonally right down direction. In addition, in the image portion 21b (halftone portion), dots of plural kinds forming this portion are not mixed homogeneously because of the same reason in the image portion 21a. This gives rise to deterioration of the image quality. In the image portion 21c, dots flow in the diagonally right down direction in a portion enclosed by a circle, that is, a so-called dot tailing phenomenon occurs, because of the same reason in the image portions 21a and 21b.

Each of the phenomena occurring in the enlarged image portions 21a through 21c deteriorates the image quality of the gradation image.

On the contrary, in the error diffusion processing method of the invention, as with the embodiments described above, for the pixel data corresponding to the dot portion formed by the nozzle judged as being a failing nozzle in the gradation image of FIG. 16, the diagonally weighted error diffusion matrix is selected from the error diffusion matrices shown in FIG. 14B, so that the pixel data is subjected to quaternary conversion through the error diffusion processing. For the pixel data corresponding to the dot portion formed by a normal nozzle judged as not being a failing nozzle, a normal error diffusion matrix is selected from the error diffusion matrices shown in FIG. 14B, so that the pixel data is subjected to quaternary conversion through the error diffusion processing. In short, the pixel data is subjected to quaternary conversion using the same error diffusion processing technique in the first embodiment. FIG. 19 shows the result of the quaternary conversion. When image portions 23a through 23c in the gradation image after the quaternary conversion shown in FIG. 19 are closely observed, a delay in switching of the kinds of dots is improved in comparison with the technique in the related art in the image portion 23a, and the dispersion property of the kinds of dots in the shadow portion is enhanced. The image quality is therefore enhanced in comparison with the image portion 21a of FIG. 18. In the image portion 23b, plural kinds of dots are mixed more homogeneously than by the technique in the related art, and the image quality is also enhanced in comparison with the image portion 21b in FIG. 18. In the image portion 23c, the dot tailing phenomenon in the high-light portion is improved in comparison with the technique in the related art, and the image quality is also enhanced in comparison with the image portion 21c of FIG. 18.

The printing devices of the first and second embodiments are characterized in that a special printing portion 20 is not necessary because the print data is generated from the image data to match with the characteristic of the print head in the existing printing device by hardly providing modifications. Hence, the existing ink jet printer in the related art can be used intact as the printing device of the invention. In addition, by separating the printing portion 12 from the printing device 100 in the embodiments above, the function can be achieved with a general-purpose printing instruction terminal (print data generation device), such as the PC, alone.

An event addressed by the invention is not limited to the flight deviation phenomenon. It goes without saying that the invention is also applicable to a case where the ink is ejected in a perpendicular direction (normally), but there is a discrepancy between the formation content of the nozzle and the normal position, and the formed dot results in a phenomenon same as the flight deviation phenomenon.

The printing devices 100 in the first and second embodiments are not limited to the line-head ink-jet printer, and it can be applied to a multi-pass ink-jet printer. In the case of a line-head ink-jet printer, it is possible to obtain high-quality printed matter in which a white streak or a dark streak is hardly noticeable by a 1-pass operation even when the fight deviation phenomenon occurs. In the case of the multi-pass ink-jet printer, printing faster than in the related art is enabled because the number of reciprocations can be reduced.

Figure 20A:
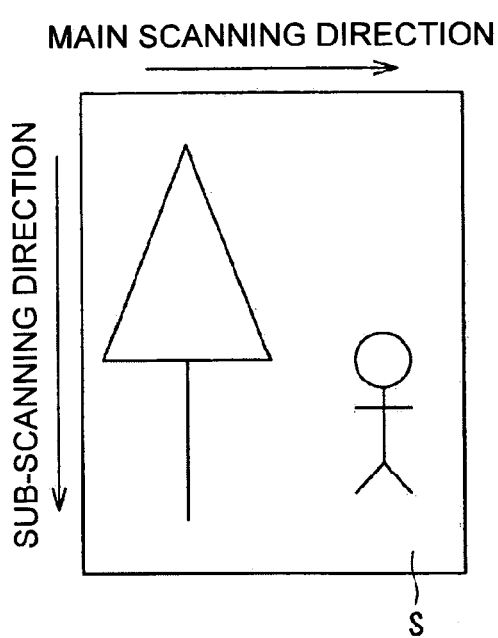
FIG. 20A through FIG. 20C are views used to describe a difference between the printing method of a multi-pass ink-jet printer and the printing method of a line-head ink-jet printer.
Figure 20B:
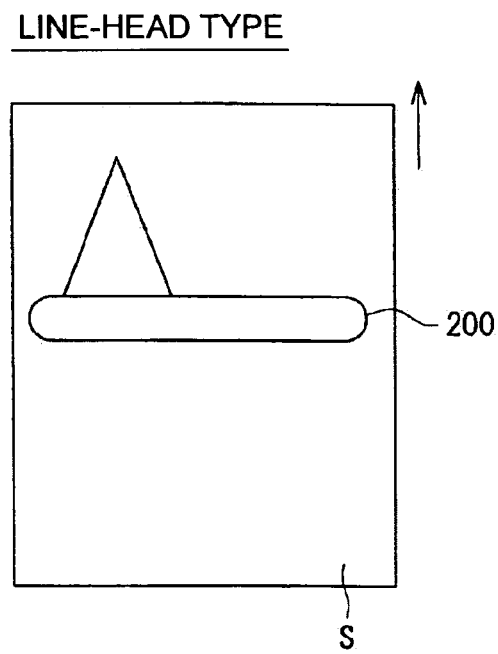
Figure 20C:
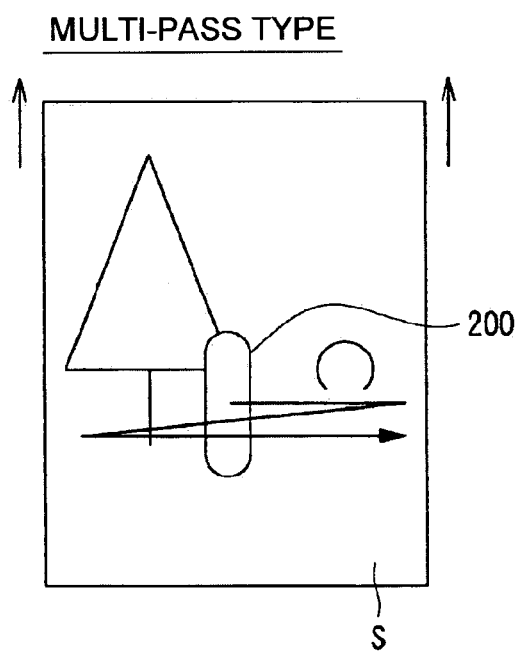

FIG. 20A through FIG. 20C show the printing methods of the line-head ink-jet printer and the multi-pass ink-jet printer.

As is shown in FIG. 20A, given the width direction of a rectangular print medium (sheet) S as the main scanning direction of the image data, and the longitudinal direction as the sub-scanning direction of the image data, then as is shown in FIG. 20B, in the case of the line-head ink-jet printer, the print head 200 is as long as the width of the print medium (sheet) S. Hence, by moving the print medium (sheet) S in the sub-scanning direction with respect to the print head 200 while fixing the print head 200, the printing can be completed by the so-called 1-pass (operation). Alternatively, printing can be executed, as with the so-called flat-head scanner, by moving the print head 200 in the sub-scanning direction while fixing the print medium (sheet) S, or by moving the both in the opposite directions. On the contrary, in the case of the multi-pass ink-jet printer, as is shown in FIG. 20C, the print head 200 far shorter than the sheet width is positioned in a direction orthogonal to the main scanning direction, and printing is executed by moving the print medium (sheet) S in the sub-scanning direction by a predetermined pitch while moving the print head 200 to reciprocate a number of times in the main scanning direction. The multi-pass ink-jet printer therefore has a disadvantage that the printing takes longer than the line-head ink-jet printer. However, because the print head 200 can be positioned repetitively at an arbitrary position, of the banding phenomenon, the white streak phenomenon, in particular, can be suppressed to some extent.

Also, the first and second embodiments described the ink-jet printer that executes printing by ejecting dot-shaped ink by way of example. However, the invention is also applicable to other printing devices using a print head in which printing mechanisms are aligned in line, for example, a thermal head printer called a thermoelectric printer or a thermal printer.

Figure 21:
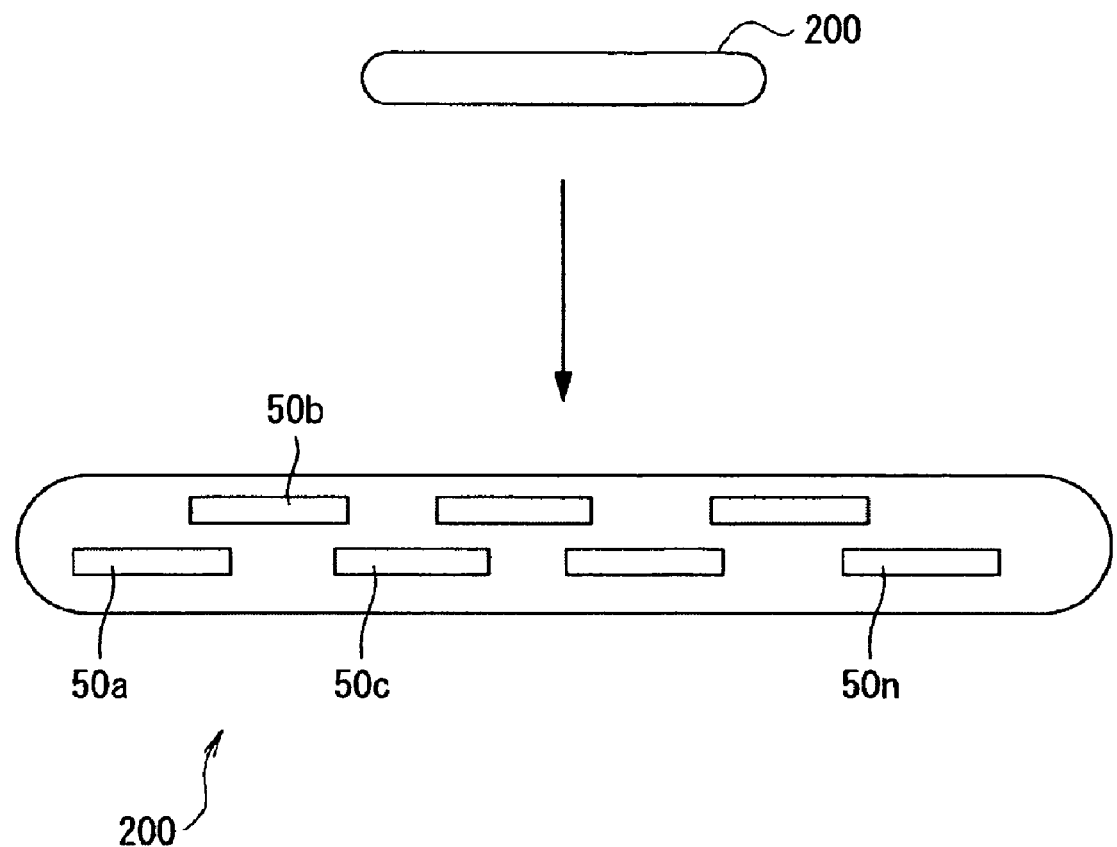
FIG. 21 is a conceptual view showing another example of the structure of the print head.
Figure 22A:
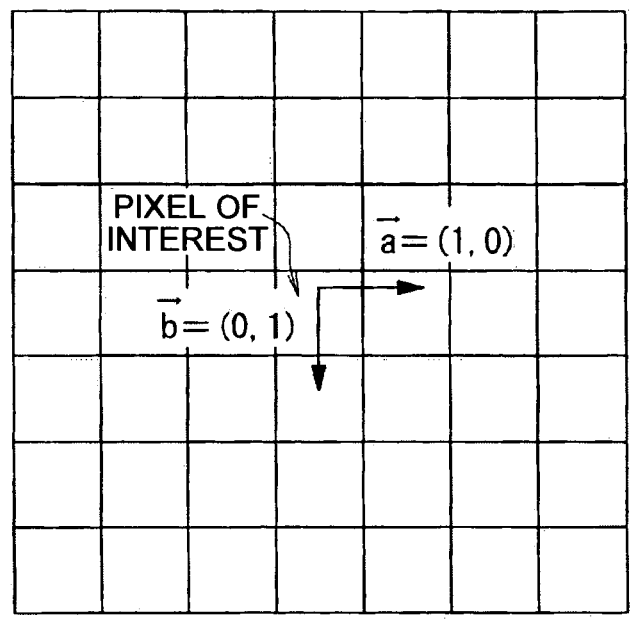
FIG. 22A through FIG. 22C are views used to describe weight vectors.
Figure 22B:
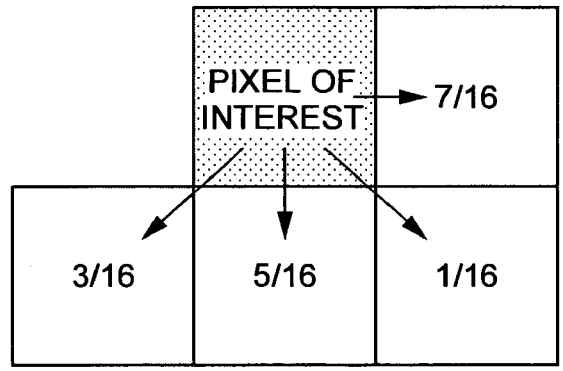
Figure 22C:
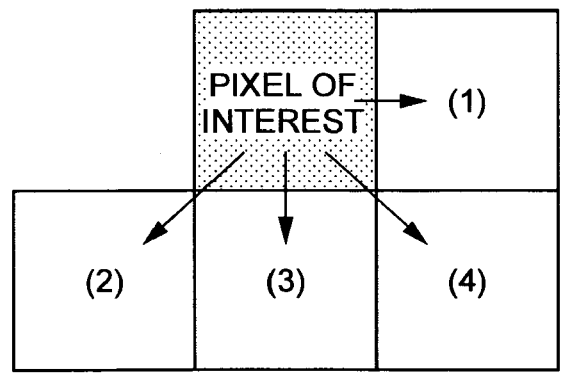

Referring to FIG. 3, the nozzle modules 50, 52, 54, and 56 of the respective colors provided to the print head 200 are of a configuration in which nozzles N are continuously aligned linearly in the longitudinal direction of the print head 200. However, as is shown in FIG. 21, each of the nozzle modules 50, 52, 54, and 56 may comprise plural short nozzle units 50a, 50b, . . . , and 50n, so that these units are aligned at the top and bottom of the print head 200 in the moving direction. In particular, by forming each of the nozzle modules 50, 52, 54, and 56 using plural short nozzle units 50a, 50b, . . . , and 50n in this manner, it is possible to shorten a distance from dot to dot substantially without narrowing the actual distance (pitch) between the dots in the respective nozzle units 50a, 50b, . . . , and 50n. The printing device is thus able to address a high-resolution image with ease.

The first and second embodiments described a case where the error diffusion processing is performed by selecting a special error diffusion matrix (diagonally weighted diffusion matrix) for avoiding the banding phenomenon caused by the flight deviation or an ink ejection failure of the nozzle N by way of example. The invention, however, is not limited to this configuration, and the invention can address other factors causing the banding by preparing an error diffusion matrix appropriate to such a banding-causing factor, such as the γ characteristic of dots formed.

The first and the second embodiments described a case where the error diffusion is performed using the error diffusion matrices having the same size, the same number of pixels as diffusion targets, and the same shape by way of example. However, the invention is not limited to this configuration. Plural kinds of error diffusion matrices, including matrices having different sizes, matrices having different numbers of the pixels as diffusion targets, and matrices having different shapes may be prepared, so that the size of the matrix, the number of the pixels as diffusion targets, and the shape of the matrix can be changed in response to, for example, a quantity of flight deviation. Alternatively, the error diffusion may be performed using a matrix of a relatively small size for the portion where the banding occurs.

In the first embodiment, the diagonally weighted error diffusion matrix is selected from a group of the same diagonally weighted error diffusion matrices for the pixel data of a failing nozzle causing the flight deviation or having an ejection failure. The invention, however, is not limited to this configuration, and an adequate group may be formed for each factor causing the banding phenomenon, such as a group for the flight deviation and a group for an ejection failure, so that an appropriate error diffusion matrix can be selected from the group of the corresponding factor.

In the first embodiment, whether the nozzle N corresponding to the selected pixel data is a failing nozzle is judged, and when the nozzle N is a failing nozzle, an error of the selected pixel data is diffused to outstanding pixel data in the neighborhood using a special error diffusion matrix. The invention, however, is not limited to this configuration. The error diffusion processing using a special error diffusion matrix may be performed by using the special error diffusion matrix not only for the selected pixel data, but also for the pixel data corresponding to the nozzles in the neighborhood of the nozzle corresponding to the selected pixel data. The nozzles in the neighborhood of the nozzle corresponding to the selected pixel data referred to herein include, for example, in the case of the occurrence of a white streak, a nozzle that forms dots at a displaced position and a nozzle that forms normal dots spaced apart from such displaced dots by a larger distance than usual. In the case of a dark streak, such nozzles include a nozzle that forms dots at a displaced position and a nozzle that forms normal dots with a distance shorter than usual from such displaced dots or a nozzle that forms dots that overlap partially or entirely on such displaced dots. The invention is not limited to this example, and the range of the neighborhood may be enlarged to include three nozzles immediately to the left and right of the nozzle in question.

What is claimed is:

1. A printing device that prints an image on a medium with a print head having nozzles capable of forming dots, the device comprising:
    an image data acquisition portion that acquires image data having an M-value (M≧3) pixel value, the M-value corresponding to a first number of possible grayscale levels that are represented by the pixel value;
    a nozzle information storage portion that stores nozzle information indicating a characteristic of each nozzle;
    an error diffusion matrix storage portion that stores plural error diffusion matrices having different diffusion ratios of an error assigned to pixel data as diffusion targets, the plural error diffusion matrices including a diagonally weighted error diffusion matrix in which a diffusion ratio of the error assigned to the pixel data corresponding to pixels as diffusion targets positioned in a diagonal direction, which is a direction other than a pixel selecting direction and a direction perpendicular to the pixel selecting direction, is made larger than the diffusion ratio assigned to pixels as diffusion targets positioned in a direction other than the diagonal direction;
    a pixel data selecting portion that selects specific pixel data in the image data;
    an N-value conversion processing portion that performs N-value conversion processing to convert the M-value pixel value indicated by the selected pixel data to an N (M>N≧2) value, the N-value corresponding to a second number of possible grayscale levels that are represented by the pixel value;
    an error diffusion portion that diffuses the error to pixel data that has not been subjected to the N-value conversion processing in the image data according to the error diffusion matrix by using a difference between:
        a value of the selected pixel data; and
        a value of the selected pixel data after the N-value conversion processing as the error, thereby updating pixel values in the image data;
    a print data generation portion that generates print data that defines information about a dot formation content of the nozzles corresponding to the image data after the N-value conversion processing; and
    a printing portion that prints the image on the medium using the print head according to the print data,
    wherein the error diffusion portion selects a specific error diffusion matrix for each selected pixel data from the error diffusion matrix storage portion according to the nozzle information, and diffuses the error to the pixel data that has not been subjected to the N-value conversion processing according to the selected error diffusion matrix, the error diffusion portion selecting the diagonally weighted error diffusion matrix when the nozzle information corresponding to the selected pixel data indicates a nozzle failure and selecting an error diffusion matrix other than the diagonally weighted error diffusion matrix when the nozzle information corresponding to the selected pixel data does not indicate a nozzle failure.

2. The printing device according to claim 1, wherein:
    the nozzle information includes ejection failure information indicating at least one of an absence and a presence of an ink ejection failure for each nozzle.

3. The printing device according to claim 1, wherein:
    the nozzle information includes information about a quantity of position displacement between an actual forming position of a dot by each nozzle and a desired forming position of the dot.

4. The printing device according to claim 3, wherein:
    the N-value conversion processing portion converts the pixel value of the pixel data corresponding to a nozzle having an ink ejection failure to a value close to one of a lowest density value and a lowest luminance value; and
    the error diffusion portion diffuses the error to the pixel data that has not been subjected to the N-value conversion processing in a neighborhood of the pixel data after conversion using the error diffusion matrix by using a difference between the pixel value of the pixel data before the conversion and the pixel value of the pixel data after the conversion as the error.

5. The printing device according to claim 1, wherein:
    in the error diffusion processing for the error of pixel data corresponding to at least one of a nozzle having a quantity of the position displacement equal to or larger than a specific quantity and a nozzle in a neighborhood thereof, the error diffusion portion diffuses the error of the pixel data to the pixel data that has not been subjected to the N-value conversion processing using the diagonally weighted error diffusion matrix.

6. The printing device according to claim 1, wherein:
    in the error diffusion processing for the error of pixel data corresponding to at least one of a nozzle having an ink ejection failure and a nozzle in a neighborhood thereof, the error diffusion portion diffuses the error of the pixel data to the pixel data that has not been subjected to the N-value conversion processing using the diagonally weighted error diffusion matrix.

7. The printing device according to claim 1, wherein:
    the print head comprises a print head in which the nozzles are aligned continuously across a width which is at least as large as a placement region of the medium.

8. The printing device according to claim 1, wherein:
the print head comprises a print head that executes printing while moving in a direction orthogonal to a transportation direction of the medium.

9. A tangible recording medium storing a program to control a printing device that prints an image on a medium with a print head having nozzles capable of forming dots, the printing device control program causing a computer to perform processing as follows:
acquiring image data having an M-value (M≧3) pixel value, the M-value corresponding to a number of possible grayscale levels that are represented by the pixel value;
selecting specific pixel data in the image data;
performing N-value conversion processing to covert the M-value pixel value indicated by the selected pixel data to an N (M>N≧2) value, the N-value corresponding to a number of possible grayscale levels that are represented by the pixel value;
selecting an error diffusion matrix from a plurality of error diffusion matrices including a diagonally weighted error diffusion matrix in which a diffusion ratio of an error assigned to pixel data corresponding to pixels as diffusion targets positioned in a diagonal direction, which is a direction other than a pixel selecting direction and a direction perpendicular to the pixel selecting direction, is made larger than the diffusion ratio assigned to the pixel data as diffusion targets positioned in a direction other than the diagonal direction;
diffusing the error to pixel data that has not been subjected to the N-value conversion processing in the image data according to the selected error diffusion matrix by using a difference between:
a value of the selected pixel data; and
a value of the selected pixel data after the N-value conversion processing as the error, thereby updating pixel values in the image data;
generating print data that defines information about a dot formation content of the nozzles corresponding to the image data after the N-value conversion processing; and
printing the image on the medium using the print head according to the print data,
wherein when diffusing the error, a specific error diffusion matrix is selected for each selected pixel data from an error diffusion matrix storage portion having stored plural error diffusion matrices having different diffusion ratios of the error assigned to pixel data as diffusion targets according to nozzle information indicating a characteristic of each nozzle, the diagonally weighted error diffusion matrix being selected when the nozzle information corresponding to the selected pixel data indicates a nozzle failure and an error diffusion matrix other than the diagonally weighted error diffusion matrix when the nozzle information corresponding to the selected pixel data does not indicate a nozzle failure, and the error is diffused to the pixel data that has not been subjected to the N-value conversion processing according to the selected error diffusion matrix.

10. A print data generation method for generating print data used in a printing device that prints an image on a medium with a print head having nozzles capable of forming dots, the print data generation method comprising:
acquiring image data having an M-value (M≧3) pixel value, the M-value corresponding to a number of possible grayscale levels that are represented by the pixel value;
selecting specific pixel data in the image data;
selecting an error diffusion matrix from a plurality of error diffusion matrices including a diagonally weighted error diffusion matrix in which a diffusion ratio of an error assigned to pixel data corresponding to pixels as diffusion targets positioned in a diagonal direction, which is a direction other than a pixel selecting direction and a direction perpendicular to the pixel selecting direction, is made larger than the diffusion ratio assigned to the pixel data as diffusion targets positioned in a direction other than the diagonal direction;
performing N-value conversion processing to covert the M-value pixel value indicated by the selected pixel data to an N (M>N≧2) value, the N-value corresponding to a number of possible grayscale levels that are represented by the pixel value;
diffusing the error to pixel data that has not been subjected to the N-value conversion processing in the image data according to the selected error diffusion matrix by using a difference between:
a value of the selected pixel data; and
a value of the selected pixel data after the N-value conversion processing as the error, thereby updating pixel values in the image data; and
generating print data for the printing device that defines information about a dot formation content of the nozzles corresponding to the image data after the N-value conversion processing,
wherein when diffusing the error, a specific error diffusion matrix is selected for each selected pixel data from an error diffusion matrix storage portion having stored plural error diffusion matrices having different diffusion ratios of the error assigned to pixel data as diffusion targets according to nozzle information indicating a characteristic of each nozzle, the diagonally weighted error diffusion matrix being selected when the nozzle information corresponding to the selected pixel data indicates a nozzle failure and an error diffusion matrix other than the diagonally weighted error diffusion matrix when the nozzle information corresponding to the selected pixel data does not indicate a nozzle failure, and the error is diffused to the pixel data that has not been subjected to the N-value conversion processing according to the selected error diffusion matrix.

* * * * *